(12) United States Patent
Farkas et al.

(10) Patent No.: US 12,363,179 B2
(45) Date of Patent: Jul. 15, 2025

(54) METHOD AND APPARATUS FOR INTER-DOMAIN CONFIGURATION OF TIME-SENSITIVE NETWORKS

(71) Applicant: Telefonaktiebolaget LM Ericsson (publ), Stockholm (SE)

(72) Inventors: János Farkas, Kecskemét (HU); Balázs Varga, Budapest (HU); György Miklós, Pilisborosjenő (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/576,824

(22) PCT Filed: Jul. 8, 2022

(86) PCT No.: PCT/IB2022/056352
§ 371 (c)(1),
(2) Date: Jan. 5, 2024

(87) PCT Pub. No.: WO2023/285937
PCT Pub. Date: Jan. 19, 2023

(65) Prior Publication Data
US 2025/0007860 A1    Jan. 2, 2025

Related U.S. Application Data

(60) Provisional application No. 63/221,189, filed on Jul. 13, 2021.

(51) Int. Cl.
*H04L 65/1069* (2022.01)
*H04L 47/80* (2022.01)
*H04L 65/80* (2022.01)

(52) U.S. Cl.
CPC ........ *H04L 65/1069* (2013.01); *H04L 47/801* (2013.01); *H04L 65/80* (2013.01)

(58) Field of Classification Search
CPC ... H04L 47/801; H04L 65/1069; H04L 65/80; H04L 45/04; H04L 45/655; H04L 47/2416; H04L 65/65; H04L 67/125; H04L 69/085
See application file for complete search history.

(56) References Cited

U.S. PATENT DOCUMENTS

| | | | | |
|---|---|---|---|---|
| 8,838,787 | B2 * | 9/2014 | Gelter | H04N 21/242 709/224 |
| 2012/0314597 | A1 * | 12/2012 | Singh | H04L 41/0686 370/252 |

(Continued)

FOREIGN PATENT DOCUMENTS

| | | | | |
|---|---|---|---|---|
| EP | 3684137 A1 | 7/2020 | | |
| EP | 4068706 A1 * | 10/2022 | | H04L 47/2491 |

(Continued)

OTHER PUBLICATIONS

"IEEE Draft Standard for Local and metropolitan area networks—Media Access Control (MAC) Bridges and Virtual Bridged Local Area Networks Amendment: Stream Reservation Protocol (SRP) Enhancements and Performance Improvements", EEE P802.1Qcc/D2.1, Feb. 2018 (2018, pp. 1-236) (Year: 2018).*

(Continued)

*Primary Examiner* — Oanh Duong
(74) *Attorney, Agent, or Firm* — Murphy, Bilak & Homiller, PLLC

(57) ABSTRACT

Time-Sensitive Networking (TSN) domains (30) include centralized entities (32, 34) for establishing and managing intra- and inter-domain TSN streams, with the inter-domain TSN streams based on an advantageous approach to inter-domain advertisement of respective end stations (40) operating as talkers and listeners. Based on exploiting and extending talker/listener messaging. inter-domain listener information returned to the TSN domain (30) of a given (Continued)

talker aggregates the status of TSN stream establishment with respect to each listener in each external TSN domain (30) that includes one or more end stations (40) interested in acting as listeners, and with respect to each external TSN domain (30) used to carry the TSN stream. Correspondingly, the configuration of network resources in the respective TSN domains (30) is made to depend on the exchanged status information.

24 Claims, 15 Drawing Sheets

(56) References Cited

U.S. PATENT DOCUMENTS

| | | | |
|---|---|---|---|
| 2012/0314713 A1* | 12/2012 | Singh | H04N 21/43615 |
| | | | 370/401 |
| 2013/0138800 A1 | 5/2013 | Gelter et al. | |
| 2016/0036926 A1* | 2/2016 | Gunther | H04N 21/43637 |
| | | | 709/219 |
| 2019/0097884 A1* | 3/2019 | Thubert | H04L 43/16 |
| 2022/0078076 A1* | 3/2022 | Chen | H04L 69/329 |
| 2023/0145093 A1* | 5/2023 | Zhu | H04L 41/0806 |
| | | | 370/235 |
| 2023/0291692 A1* | 9/2023 | Bonneville | H04L 47/2491 |
| 2024/0305554 A1* | 9/2024 | Fu | H04W 40/24 |

FOREIGN PATENT DOCUMENTS

| | | | | |
|---|---|---|---|---|
| EP | 4236120 A1 * | 8/2023 | | H04J 3/0667 |
| WO | 2021013338 A1 | 1/2021 | | |

OTHER PUBLICATIONS

Schmitt, Juergen , et al., "Reservation of deterministic IP-Flows within a Customer Industrial Automation Network", IEEE Draft; New-Schmitt-Ip-Reservation-Whitepaper-1019-v01, IEEE-SA, Piscataway, NJ, USA, vol. 802.1, No. v01, Oct. 30, 2019, 13 pages.
Unknown , "Bridges and Bridged Networks—Amendment 31: Stream Reservation Protocol (SRP) Enhancements and Performance Improvements", IEEE Standard for Local and Metropolitan Area Networks; IEEE Std 802.1Qcc™-2018; New York, NY, Oct. 31, 2018, 1-208.

* cited by examiner

METHOD AND APPARATUS FOR INTER-DOMAIN CONFIGURATION OF TIME-SENSITIVE NETWORKS

TECHNICAL FIELD

Methods and apparatuses disclosed herein extend listener-talker relationships between two or more centrally managed Time-Sensitive Network (TSN) domains.

BACKGROUND

The Institute of Electrical and Electronics Engineers (IEEE) developed Time-Sensitive Networking (TSN) to enhance IEEE 802.1 and IEEE 802.3 Ethernet standards, to an entirely new level of determinism. TSN can be seen as an evolution of Ethernet to guarantee low end-to-end latency, low jitter, and low packet loss.

The TSN Task Group (TG) within the IEEE 802.1 Working Group deals with deterministic services through IEEE 802 networks. The TSN TG specifies the tools of the TSN toolbox, as well as the use of the tools for a particular purpose. TSN TG is chartered to provide deterministic services through IEEE 802 networks with guaranteed packet transport, low packet loss, bounded low latency, and low packet delay variation.

To leverage the TSN tools, they must be configured in support of the TSN streams through the network. In other words, TSN streams must be established through the network via TSN configuration mechanisms.

IEEE 802.1Qcc-2018 is a standard for Local and Metropolitan Area Networks-Bridges and Bridged Networks, with Amendment 31 referring to stream reservation protocol (SRP) enhancements and performance improvements. According to 802.1Qcc, the "fully centralized" configuration model does not use distributed reservation or signaling protocols for the configuration of TSN streams. Instead, the fully centralized configuration model—"centralized configuration model" hereafter—relies on centralized entities as illustrated in the FIG. 1.

The centralized configuration model allows for simpler TSN endpoints—the "talking" and "listening" devices that provide or use TSN streams flowing within the network--because the TSN endpoints, also referred to as network devices, do not need to implement and run signaling protocols or perform the corresponding computations. The centralized entities can be implemented in more capable devices or in some cloud or edge/fog computing devices, thus enabling higher degree of optimizations, automatizations, potentially assisted with Artificial Intelligence.

As FIG. 1 illustrates, the centralized configuration model defines a Centralized User Configuration (CUC) 12 and a Centralized Network Configuration (CNC) 14. The CUC 12 is a centralized entity that discovers end stations, retrieves end station capabilities and user requirements, and configures TSN features in end stations, which are shown as either "talkers" 18 or "listeners" 20 in the figure. The protocols that the CUC 12 uses for communication with end stations are specific to the user application, and not specified by the 802.1Qcc standard.

The CUC 12 exchanges information with the CNC 14, for configuration of TSN features within the network, on behalf of the end stations. Actions performed by the CNC 14 include performing the network configuration—i.e., configuring network resources on behalf of TSN applications (users). The network resources comprise "bridges" 16, which may be Ethernet switches, and are operative to transmit Ethernet frames of a TSN flow on a schedule and receive Ethernet frames of a TSN flow on a schedule. The arrangement provides for deterministic timing and low jitter between a talker 18 outputting a TSN flow and a listener 20 receiving the TSN flow.

Industrial automation—e.g., Industrial Internet of Things (IoT)—is a key application area of TSN. In that context and in other application areas of TSN, there may be an unavoidable fragmentation of TSN end stations into multiple TSN domains (configuration domains). For example, different industrial machines or different subsystems within a manufacturing facility may be organized as different network domains. Such realities make configuration of TSN streams through multiple TSN domains essential, and the Third Generation Partnership Project (3GPP) introduced support for TSN in Release 16 of its network specifications, such that a Fifth Generation (5G) System (5GS) can operate as a logical TSN bridge when included in a TSN network.

There currently exist certain challenge(s). For example, no solution exists for configuration of TSN streams through multiple TSN domains that each use a centralized configuration model. Consequently, advantages and features of the centralized configuration model are not available in operational contexts that require inter-domain TSN flows—i.e., TSN flows (streams) going between separate TSN domains.

SUMMARY

Certain aspects of the disclosure and their embodiments may provide solutions to these or other challenges. The method described herein proposes a new solution for the configuration of TSN streams traversing multiple TSN domains that each follow the centralized configuration model. The disclosed solutions advantageously exploit and modify or extend the principles laid down for intra-domain configuration specified by the corresponding TSN standards, especially, that of the centralized configuration model. The proposed solutions provide for communications and configuration control among centralized network and user control entities that belong to different (multiple) TSN domains, for setting up TSN streams with endpoints in different TSN domains.

The disclosed techniques provide new solutions for the configuration of TSN streams traversing multiple TSN domains that follow the centralized configuration model, thus preserving the significant practical and operational advantages attendant to the centralized model, while offering the flexibility of inter-domain TSN operations. The solutions include detailed approaches used to set up inter-domain TSN streams between respective TSN domains that are each based on the centralized configuration model.

In particular, the solutions provide mechanisms for advertising and using information about the source (talker) and the potential receivers (listeners) of a TSN stream, allowing for that information to be propagated throughout multiple TSN domains. such that the solution leverages the primitives and building blocks defined for single domain configuration. In addition, the solution defines the interaction between centralized control entities in the respective TSN domains and provides the steps that are needed if it is possible to establish a stream as well as the steps that are invoked when it is not possible to establish a stream. The configuration actions are crafted to make sure that stream establishment is successful, if establishment is possible, and also include advantageous resource reservation actions.

To achieve inter-domain TSN stream establishment, a method in one or more embodiments disclosed herein introduces new operations for a centralized network controller and a centralized user controller of a TSN domain operating according to the centralized configuration model. In the parlance of IEEE 802.1Qcc, the CNC is an example of a centralized network controller discussed herein, and the CUC is an example of the centralized user controller discussed herein.

The method extends the centralized configuration model with inter-domain operations and capabilities. Namely, the CNCs of different domains propagate advertisements on the source and the destinations for stream establishment among each other, i.e., store, forward, and filter them. Furthermore, the CNCs also provide information learned from stream establishment information of other domains to the CUC of their domain. Correspondingly, the CUCs need to handle the information received from their CNC (which never happens in an intra-domain scenario). In addition, the CUCs need to communicate with their end stations about streams whose other end point is in another domain, e.g., the CUC informs its end stations about the existence of such streams and figures out whether the end stations are to be part of a stream.

Certain embodiments may provide one or more of the following technical advantage(s). One example advantage is that the disclosed solutions provide for inter-domain TSN streams while still allowing the involved TSN domains to use the centralized configuration model. Among other things, the centralized configuration model allows the TSN end stations and bridges to be simpler than they would be in distributed configuration models, because control of the TSN domain is centralized in one or more centralized entities, such as a centralized network controller and a centralized user controller. The simplification of device implementations is beneficial for 5G scenarios, for example, when a 5GS acts as a TSN bridge in a TSN deployment. A further advantage is that the disclosed solutions allow for cloud-or edge-computing implementation of the centralized entities. Such entities in one or more embodiments have the operational resources needed to perform sophisticated optimizations within or across the TSN domains, such as by leveraging artificial intelligence.

Further, the disclosed solutions follow the principles of the centralized configuration model in the "normal" intra-domain TSN configuration, and leverage the primitives standardized for such single-domain (intra-domain) operations in the centralized configuration model. Consequently, while the disclosed solutions extend and modify certain aspects of the single-domain centralized configuration model, the extensions and modifications are philosophically consistent with the existing operations, which aids their implementation.

Of course, the present invention is not limited to the above features and advantages. Indeed, those skilled in the art will recognize additional features and advantages upon reading the following detailed description, and upon viewing the accompanying drawings.

DETAILED DESCRIPTION

Some of the embodiments contemplated herein will now be described more fully with reference to the accompanying drawings. Embodiments are provided by way of example to convey the scope of the subject matter to those skilled in the art.

Section 1—Example Centralized Configuration Model

Figure 1:
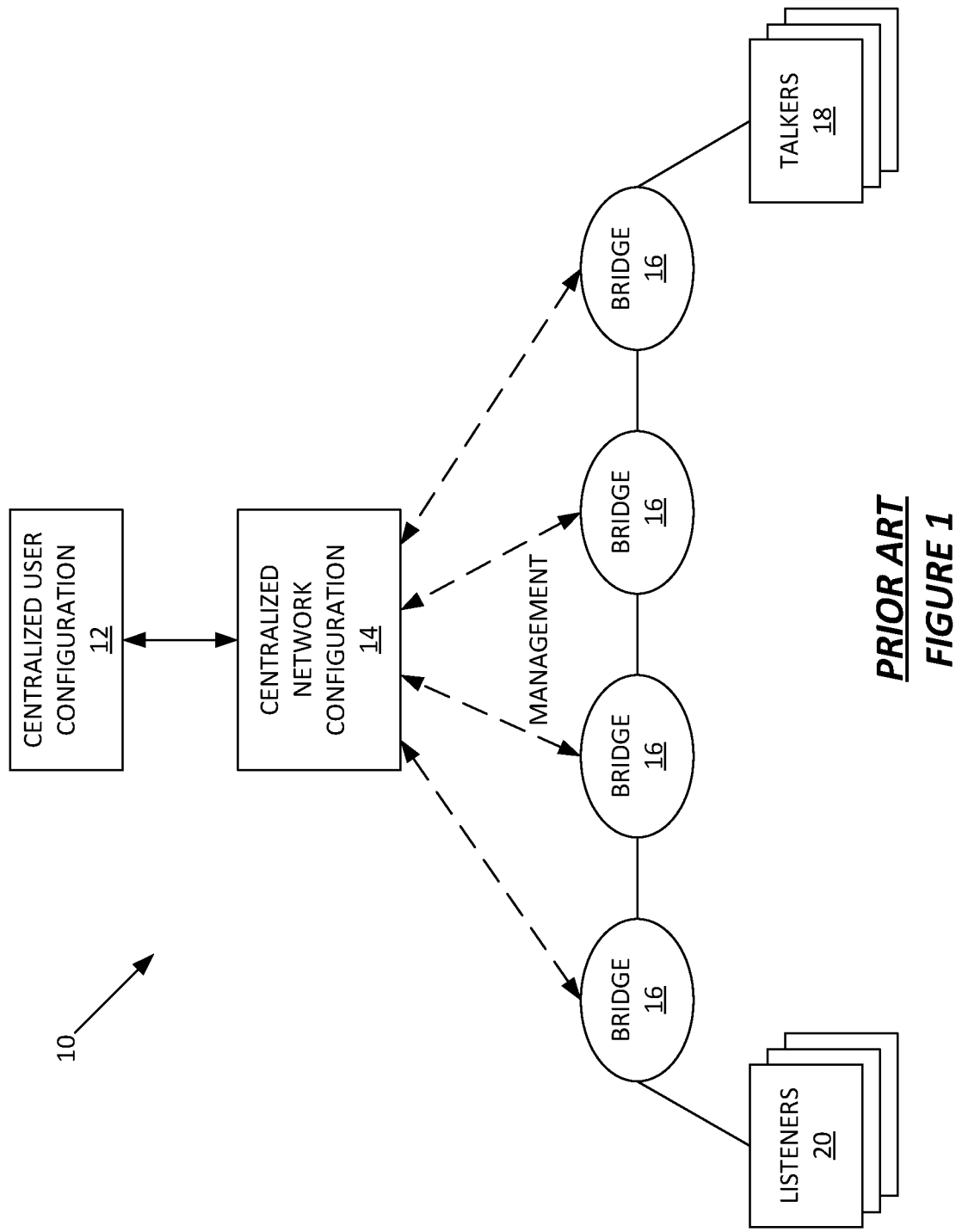
FIG. 1 is a block diagram of a typical single Time-Sensitive Networking (TSN) domain using centralized management.
Figure 2:
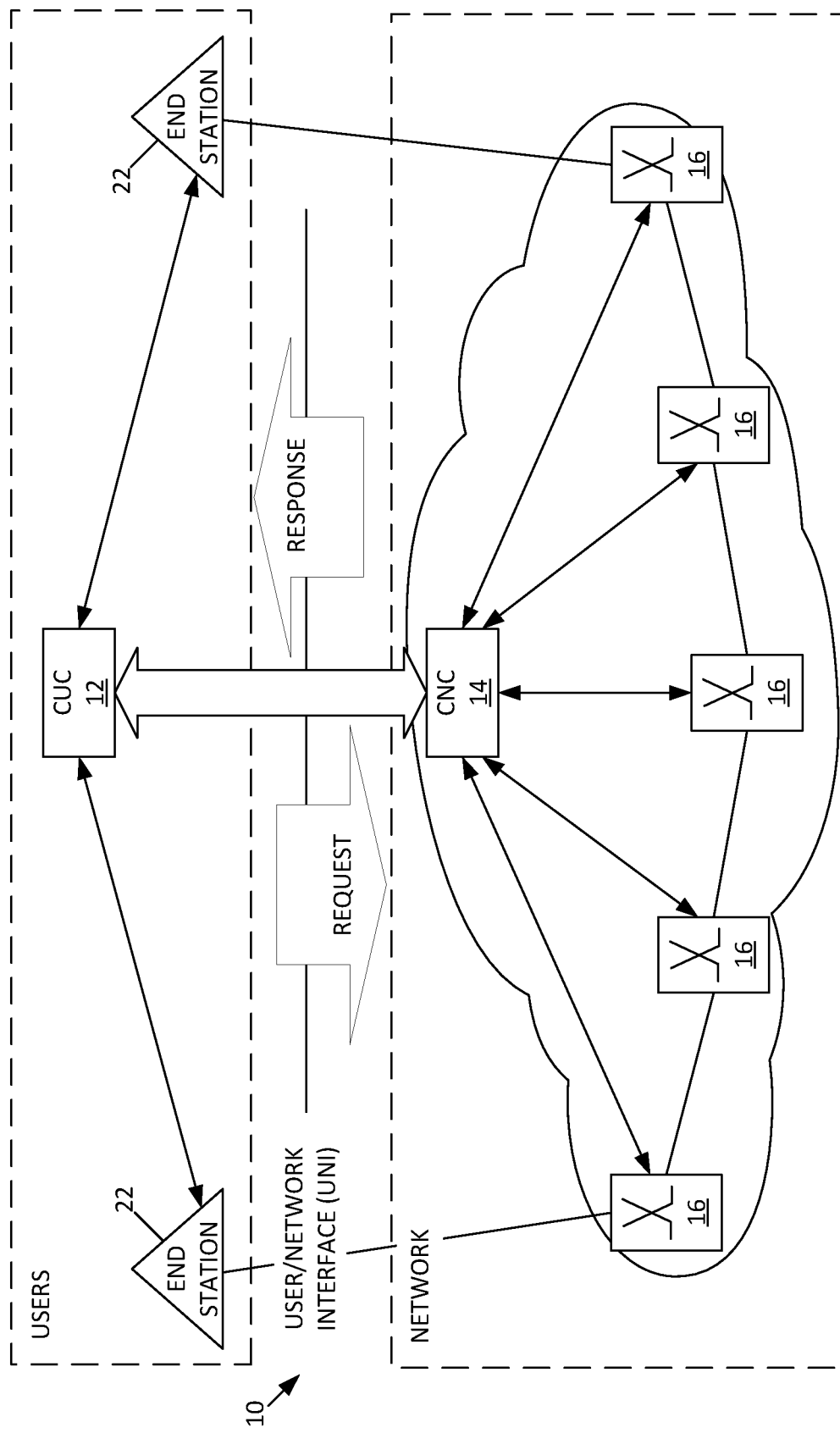
FIG. 2 is a block diagram that adds further details for the single TSN domain introduced in FIG. 1.

Like FIG. 1, FIG. 2 illustrates a known implementation of a single TSN domain having a centralized configuration model according to IEEE 802.1Qcc but adds additional details. The methods described herein follow but advantageously extend TSN configuration principles specified in 802.1Qcc for single TSN domain scenarios. 802.1Qcc also specifies the fully centralized TSN configuration model for single TSN domain scenarios where the user and the network are interconnected by the User/Network Interface (UNI), which is illustrated in FIG. 2. In FIG. 2, with respect to any given time or application, one end station 22 operates as a talker and one or more other end stations 22 operate as listeners, with the CUC 12 and CNC 14 cooperating to configure the network of bridges 16.

Again, for consistent understanding, the phrase "centralized configuration model" refers to the use of centralized configuration entities that handle the user discovery/configuration and network configuration for establishing TSN streams within a single TSN domain, with the specific example from the IEEE 802.1Qcc standard being referred to as the "fully centralized TSN configuration model". Nevertheless, these centralized configuration entities may be used in combination with distributed entities in certain realizations of the methods described herein.

The underlying single-domain principles enable flexible integration of TSN configuration into a variety of protocols. Such flexibility is achieved by specifying the TSN user/network configuration information in a manner that is independent of schema, encoding, or protocol. A user/network protocol then applies a specific schema and/or encoding for the configuration information. For example, for the fully centralized configuration model, 802.1Qcc specifies the UNI configuration information in YANG snippets which can be carried, e.g., by Netconf or Restconf.

The methods described herein extend the fully centralized TSN configuration for scenarios that include multiple TSN domains and define inter-domain configuration such that it extends the request/response exchange specified for the UNI by 802.1Qcc. In the context of the extensions disclosed herein for inter-domain configuration between two or more TSN domains that are each based on the centralized configuration mode, in a "request," an end station or CUC transmits a protocol message that contains a Talker or Listener group. In a "response," a bridge or CNC transmits a protocol message that contains a Status group, which indicates whether or not the involved TSN stream has been successfully established.

The Talker group specifies the following: (a) Talker's behavior for TSN stream (how/when transmitted); (b) Talker's requirements from the network; and (c) TSN capabilities of the Talker's interface(s).

In the fully distributed model and the centralized network/distributed user model defined in IEEE 802.1Qcc, the Talker group originates from the Talker's end station. In the fully centralized model, the Talker group originates from the CUC, also referred to herein as a centralized user controller.

The Listener group specifies the following: (a) Listener's requirements from the network; and (b) TSN capabilities of the Listener's interface(s).

In the fully distributed model and the centralized network/distributed user model defined by IEEE 802.1Qcc, the Listener group originates from the Listener's end station. In the fully centralized model, the Listener group originates from the CUC.

Inter-domain stream configuration data in one or more embodiments of the methods and apparatuses disclosed herein is based on domain internal configuration data, which makes the disclosed solutions a practical and efficient extension of the intra-domain operations set out in the fully centralized model.

Section 2—Example Inter-Domain Configuration System and Steps

Figure 3:
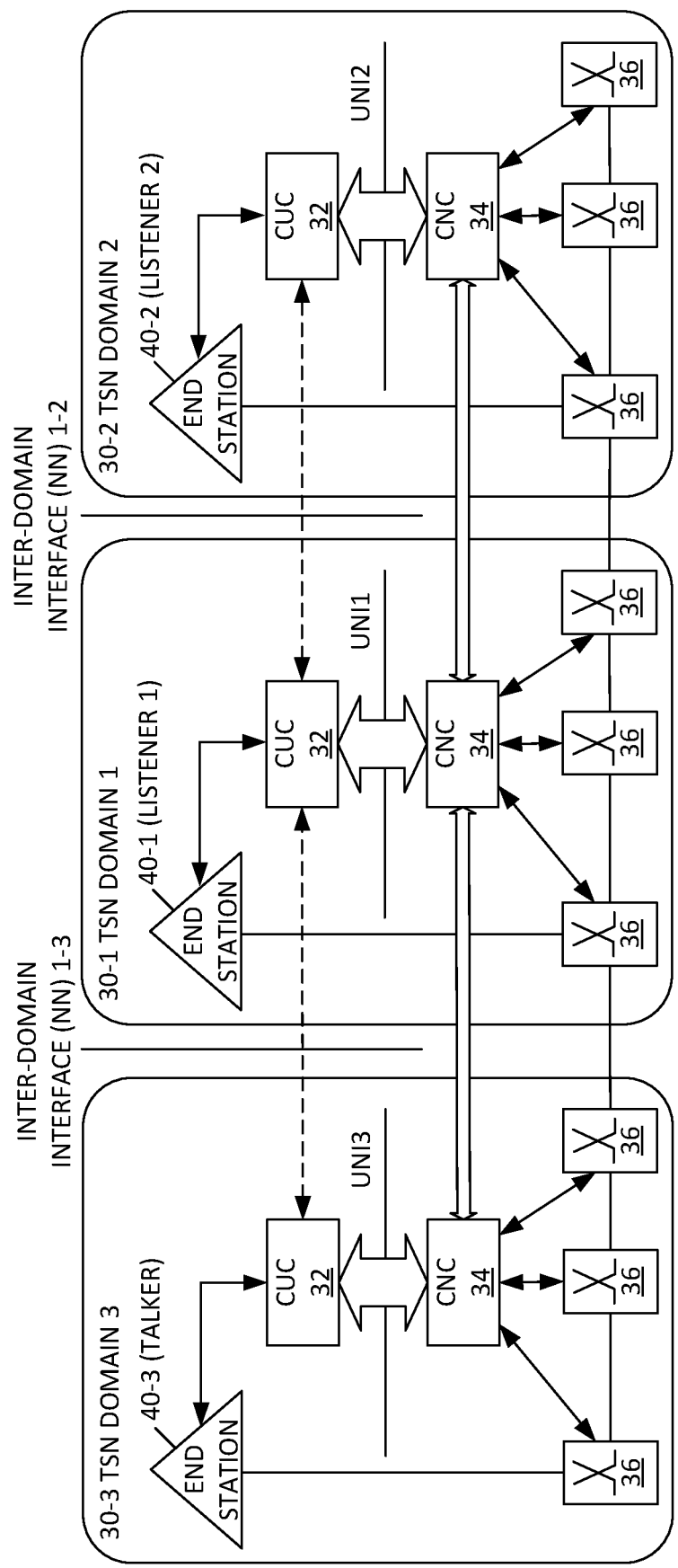
FIGS. 3 and 4 are block diagrams of respective centrally managed TSN domains that are each configured to support advertising and establishing inter-domain TSN streams, in accordance with some embodiments.

FIG. 3 illustrates an arrangement supporting inter-domain TSN streams according to one or more embodiments disclosed herein, for inter-domain TSN streams based on use of a centralized configuration model in each of the respective TSN domains 30—e.g., each TSN domain 30 uses the fully centralized model defined in IEEE 802.1Qcc, but each TSN domain 30 includes at least one CUC 32 and a CNC 34 that are configured to support the establishment and management of inter-TSN domain TSN streams according to one or more example embodiments disclosed herein.

In more detail, FIG. 3 illustrates multiple centralized TSN domains 30, which are interconnected by inter-domain interfaces (also referred to as Network/Network Interface (NNI)). The figure illustrates three TSN domains 30-1, 30-2, and 30-3; however, there may be any number of TSN domains 30 interconnected, e.g., in a chain or using a more complex topology. In some cases, it is decided a priori which TSN end stations 40 communicate to each other, even if they are in different TSN domains 30. In such cases, the pairing information is shared with the CUCs 32 that control the end stations 40 to be involved in the communication and/or with the end stations 40 themselves.

Figure 4:
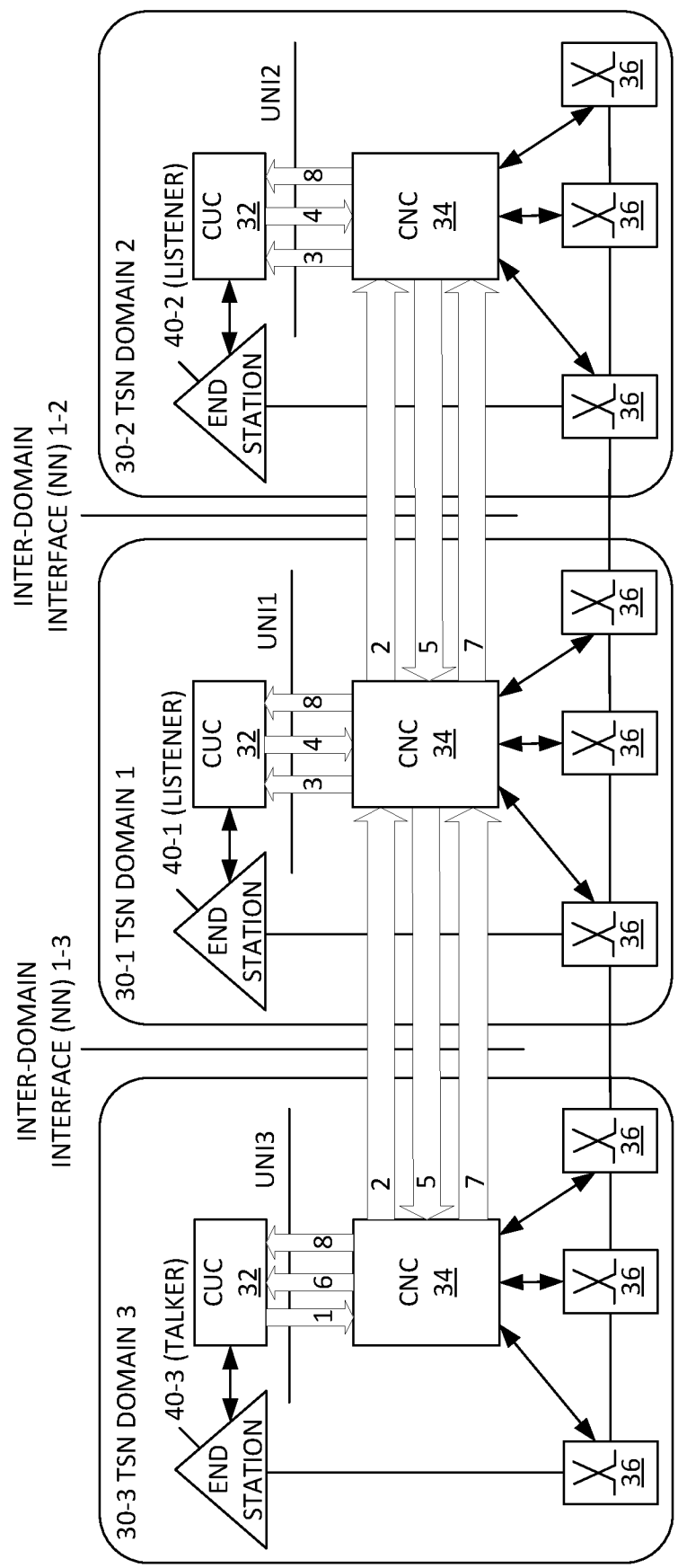

FIG. 4 uses the example arrangement introduced in FIG. 3 and depicts numbered steps and the corresponding communications comprised in those steps, with FIGS. 5A-D depicting an example method 500 of operation according to the steps illustrated in FIG. 4. In the example context of FIGS. 4 and 5A-D, a method 500 proposed herein according to one or more embodiments maintains that a CUC 32 communicates with the CNC 34 within its own TSN domain 30. CNCs 34 of adjacent neighbor TSN domains 30 then communicate to each other via the inter-domain interfaces, e.g., network interconnections. Ultimately, the information about end stations 40 to be involved in a certain communication, i.e., a certain TSN stream, propagate between or among the corresponding CUCs 32 in the respective TSN domains 30. Such propagation establishes or otherwise represents logical connections between the respective CUCs 32, which connectivity is illustrated by the dashed lines interconnecting the CUCs 32 across the multiple TSN domains 30.

FIG. 4 illustrates three "waves" of information propagation introduced by the method 500 shown in FIGS. 5A-D, with FIGS. 5A-D providing details regarding the contents of the communications carried out in the respective numbered steps seen in FIG. 4.

After a checkpoint (C), the steps with success at the checkpoint are indicted with "s" in the step identifier (ID) whereas "f" indicates a failed status for the corresponding step in FIGS. 5A-D. FIG. 4 illustrates a simplified system view sufficient to explain the operational details. For example, only three TSN domains 30 are shown, i.e., 30-1, 30-2, and 30-3, and only one end station 40 is shown in each TSN domain 30, i.e., end station 40-1 in TSN domain 30-1, end station 40-2 in TSN domain 30-2, and end station 40-3 in TSN domain 30-3. Furthermore, the establishment of one TSN stream is illustrated. There may be a greater or lesser number of TSN domains 30 carrying out inter-domain operations and the individual TSN domains 30 may include any number of TSN end stations 40 operating in Listener or Talker roles and a given TSN station 40 may be a Talker with respect to one or more TSN streams and a Listener with respect to one or more other TSN streams.

In the example, end station 40-3 of TSN Domain 30-3 is a Talker, i.e., the source of a TSN stream (data flow) and End station 40-1 of TSN Domain 30-1 and end station 40-2 of TSN Domain 30-2 are the Listeners, i.e., the destinations/receivers of the TSN stream. Of course, the disclosed method supports a potentially large number of Listeners potentially residing in different TSN domains 30. Furthermore, the method is applicable for complex setups, e.g., for a large number of TSN domains 30, a large number of TSN streams, and a large number of end stations 40 within a domain.

Section 2.1 Prerequisites

A mandatory prerequisite for an inter-domain method to operate is that a communication path for inter-domain communication exists, e.g., in the form of a multi-domain Virtual Local Area Network (VLAN). Inter-domain connectivity can be established, e.g., by default configuration values, by harmonized configuration of the TSN domains 30, or by an active topology enforcement mechanism, e.g., by the Multiple Spanning Tree Protocol (MSTP) or by Shortest Path Bridging (SPB). Such approaches enable the inter-domain configuration information to traverse through the inter-domain interfaces that communicatively intercouple the respective TSN domains 30.

Optionally, the end stations 40 among which a TSN stream needs to be established may be paired together by some means and this pairing information may be provided to them and/or to their CUC 32. This pairing may be provided by an entity, e.g., a higher-level central entity in the deployment, by some kind of configuration, etc. If such pairing is performed, then some information about the pairing(s) may be shared with the end stations 40 or the CUCs 32 involved in the communication. This shared information may contain the ID of the TSN stream to be established, IDs of the end stations 40 to be interconnected (e.g., Media Access Control (MAC) addresses), and IDs of the TSN domains 30 these end stations 40 reside in. The pairing information may simplify the operation of the method 500. However, the pairing information is optional. Therefore, the method 500 is described for the most complex case, when there is no end station pairing entity and the optional simplifications are pointed out for the cases when possible.

Section 2.2 Basics

For an example implementation of the inter-domain configuration method 500 where there is no a priori pairing of Talker/Listener roles among the TSN end stations 40 across the multiple TSN domains 30, then the method 500 implements the pairing functionality. That is, the information about the Talker and its TSN stream is advertised through the TSN domains 30 and the Listeners that are interested in receiving the TSN stream can subscribe to it, i.e., join the TSN stream.

In at least one embodiment, the method 500 described herein maintains the Request and Response between CUC 32 and CNC 34 via the UNI as specified by IEEE 802.1Qcc as described in Section 1.

In at least one embodiment, the method 500 also includes maintaining and leveraging the information elements specified by IEEE 802.1Qcc for the communication between the CUC 32 and the CNC 34 via the UNI. Examples of information elements or sets of information that is exploited herein to extend TSN streams between centrally-managed TSN domains 30 include the Talker group (see 46.2.3 in 802.1Qcc), the Listener group (see 46.2.4 in 802.1Qcc), Status group (see 46.2.5 in 802.1Qcc), TalkerStatus (see 46.2.5.1.1 in 802.1Qcc) ListenerStatus (see 46.2.5.1.2 in 802.1Qcc).

In one or more embodiments, the method 500 provides information distribution over the inter domain interfaces such that the CNCs 34 can assemble a Status group and provide Response to the Request of their CUCs 32. The method 500 ensures the distribution of the information on the Talkers and Listeners as well as information on their status with respect to TSN stream establishment.

In order to achieve such functionality, the method 500 introduces new combinations of the information elements to be transmitted among the CNCs 34 over inter-domain interfaces. Furthermore, the method 500 introduces certain information extensions, e.g., Domain ID.

The method 500 advantageously defines or otherwise exploits three types of configuration messages on inter-domain interfaces, where these three types of configuration messages enable the configuration of inter-domain TSN streams among TSN domains 30 that are based on the fully centralized model defined by IEEE 802.1Qcc.

One new type of configuration message is the Talker Advertisement, which advantageously includes a Talker group and a Status group. The information that a Talker group contains is specified in subclause 46.2.3 in 802.1Qcc. For example, MAC address(es) of the Talker are conveyed by the EndStationInterfaces group (as specified in subclause 46.2.3.3 in 802.1Qcc), TSN stream ID is conveyed by the TSN streamID group (as specified in subclause 46.2.3.1 in 802.1Qcc). For the establishment of a TSN stream, the Talker group carried in a Talker Advertisement includes each information subgroup that is specified as mandatory for the Join operation in subclause 46.2.3 in 802.1Qcc and may include each information subgroup that is specified as optional for the Join operation in subclause 46.2.3 in 802.1Qcc. For leaving a TSN stream, the Talker group carried in a Talker Advertisement includes each information subgroup that is specified as mandatory for the Leave operation in subclause 46.2.3 in 802.1Qcc and may include each information subgroup that is specified as optional for the Leave operation in subclause 46.2.3 in 802.1Qcc. In order to encode the status of the Talker, a Talker Advertisement includes a Status group as specified in subclause 46.2.5 in 802.1Qcc. In addition, the Talker Advertisement may include the ID of the TSN domain to which the Talker belongs.

Another new type of configuration message is the Listener Advertisement, which includes one or more Listener groups and a Status group corresponding to each Listener. The information that a Listener group contains is specified in subclause 46.2.4 in 802.1Qcc. For example, MAC address(es) of the Listener are conveyed by the EndStation-Interfaces group specified in subclause 46.2.3.3 in 802.1Qcc. TSN stream ID is conveyed by the TSN streamID group specified in subclause 46.2.3.1 in 802.1Qcc. For the establishment of a TSN stream, the Listener group in a Listener Advertisement includes each information subgroup that is specified as mandatory for the Join operation in subclause 46.2.4 in IEEE 802.1Qcc and may include each information subgroup that is specified as optional for the Join operation in subclause 46.2.4 in 802.1Qcc. For leaving of a TSN stream, the Listener group in a Listener Advertisement includes each information subgroup that is specified as mandatory for the Leave operation in subclause 46.2.4 in 802.1Qcc and may include each information subgroup that is specified as optional for the Leave operation in subclause 46.2.4 in 802.1Qcc. In order to encode the status of a Listener, a Listener Advertisement includes a Status group for each Listener the Listener Advertisement is about as specified in subclause 46.2.5 in 802.1Qcc. In addition, the Listener Advertisement may include the ID of the TSN domain 30 to which the Listener belongs.

Another new type of configuration message is a Status message, which includes a Status group. The information that a Status group contains is specified in subclause 46.2.5 in 802.1Qcc. For example, the Status group includes TSN stream ID and StatusInfo, which can encode whether the establishment of the TSN stream to a Listener is Ready or Failed. The Status group for stream establishment includes each information subgroup that is specified as mandatory for the Join operation in subclause 46.2.5 in 802.1Qcc and may include each information subgroup that is specified as optional for the Join operation in subclause 46.2.5 in 802.1Qcc. In addition, the Response may include a list of the IDs of the TSN domain(s) 30 through which the TSN stream has been established.

Another interesting aspect of the new Status message is that it includes information elements or fields that may be added or filled in by the centralized entity/entities in more than one TSN domain 30. For example, one TSN domain 30 may originate a Status message with certain information not filled in, because such information depends on statuses that are not known or discernable to the originating TSN domain 30, e.g., because they involve connectivity and resource dependencies in one or more other TSN domains 30. However, propagation of the status message to or through such other TSN domains 30 allow for the completion of the status information. This can be understood, for example, as an originating TSN domain 30 sending out a certain Status message and having that Status message echoed back to it, or having a related Status message return, where the echoed or returned Status message has accumulated status information carried within it, corresponding to the various connectivity and resource dependencies in the involved TSN domains 30.

Messages in FIG. 4 denoted by the numbers "2" and "3" are Talker Advertisements. The messages denoted by the numbers "5" and "6" are Listener Advertisements, while the messages denoted by the number "7" are Status messages.

The CNCs 34 store the inter-domain messages, i.e., Talker Advertisements, Listener Advertisements and Status messages, before forwarding them onwards to other TSN domains 30. This operation can be enhanced if a CNC 34 not only stores and forwards but also filters the inter-domain messages. Filtering can include not forwarding already received and forwarded inter-domain messages, which is beneficial for implementing loop-free inter-domain communication paths. A CNC 34 may implement advanced filtering, e.g., remove some domain privacy sensitive information from inter-domain messages. For example, information on domain-internal Listeners can be removed if a Talker Advertisement includes domain-internal Listener groups as well. All the inter-domain related receiving, storing, forwarding, and filtering features are new for CNCs compared to 802.1Qcc.

The operation of the method 500 is explained in the following via the description of the flowchart in FIGS. 5A-D. The method 500 illustrates example operations corresponding to an end station 40 in a given centrally managed TSN domain 30 as a Talker, with one or more end stations 40 in one or more other centrally managed TSN domains 30 as Listeners interested in the TSN stream to be output by the Talker. There may be one or more transit TSN domains 30 that interconnect the TSN domain 30 of the Talker with the TSN domain(s) of the Listeners and, as noted, a given TSN domain 30 may include one or more Listeners, while acting as a transit TSN domain 30 for one or more other Listeners in one or more other TSN domains 30 that are further removed from the TSN domain 30 of the Talker.

Figure 5A:
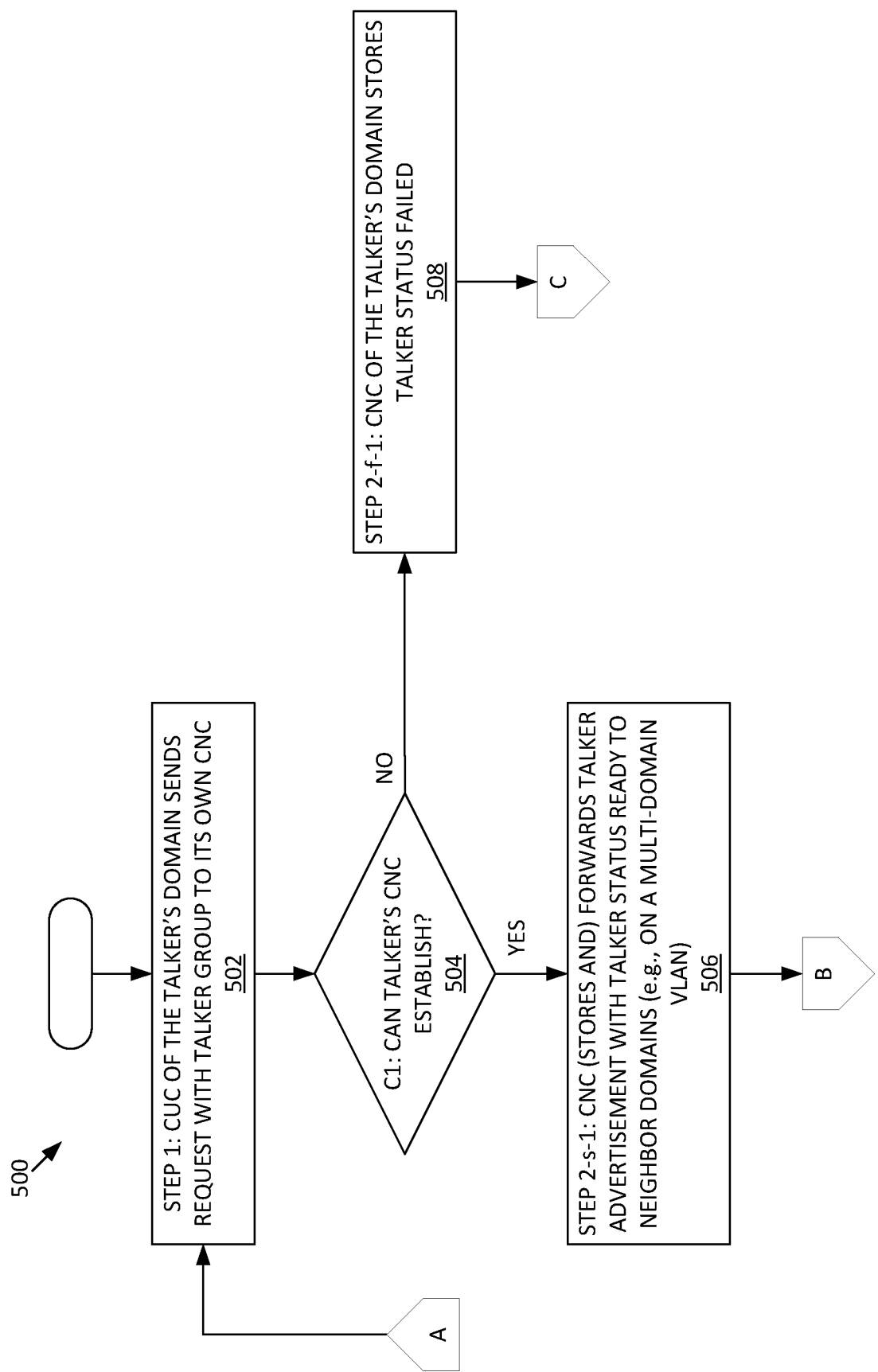
FIGS. 5A-D together depict a logic flow diagram of a method of advertising and establishing inter-domain TSN streams, in accordance with some embodiments.
Figure 5B:
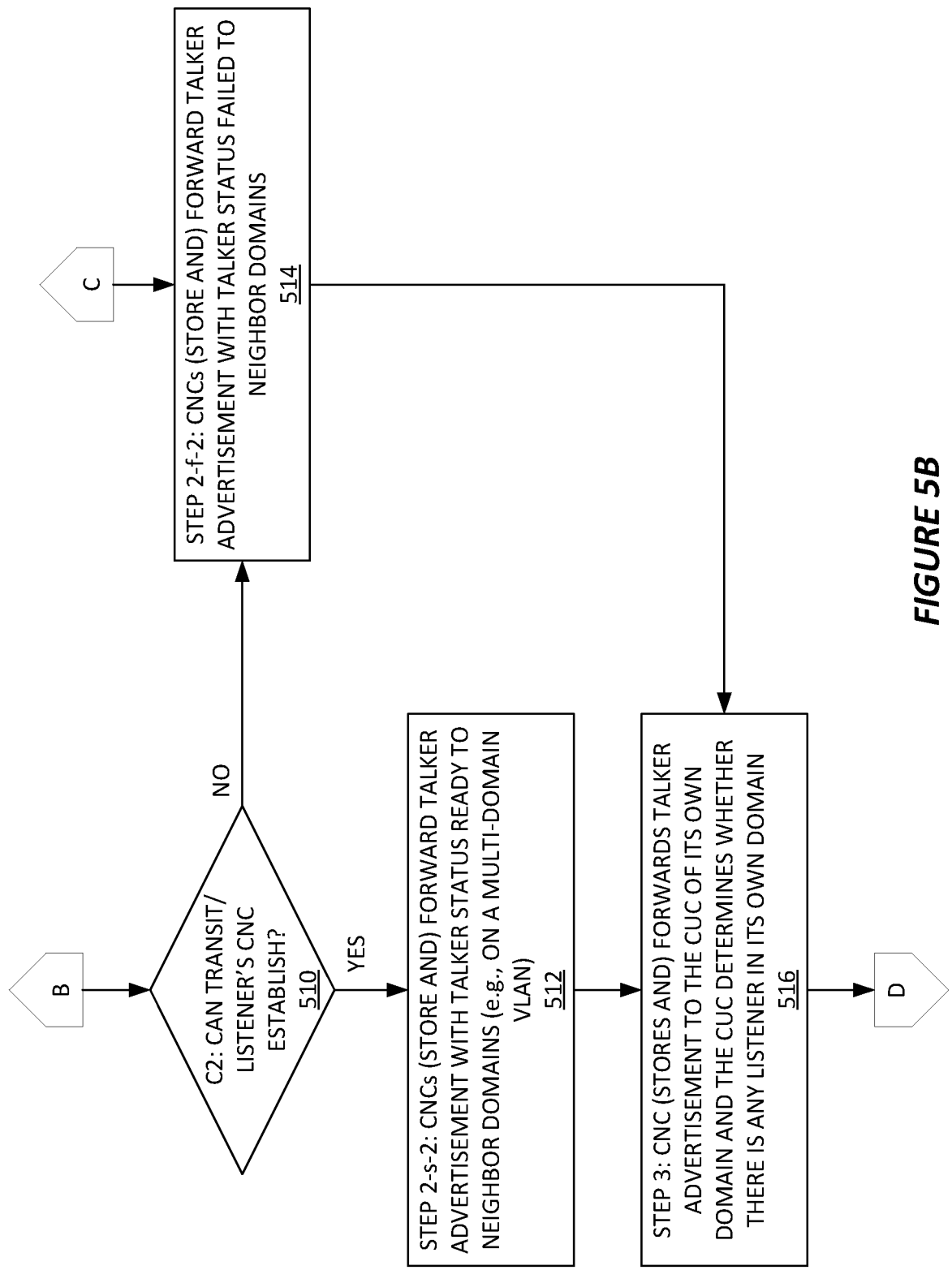
Figure 5C:
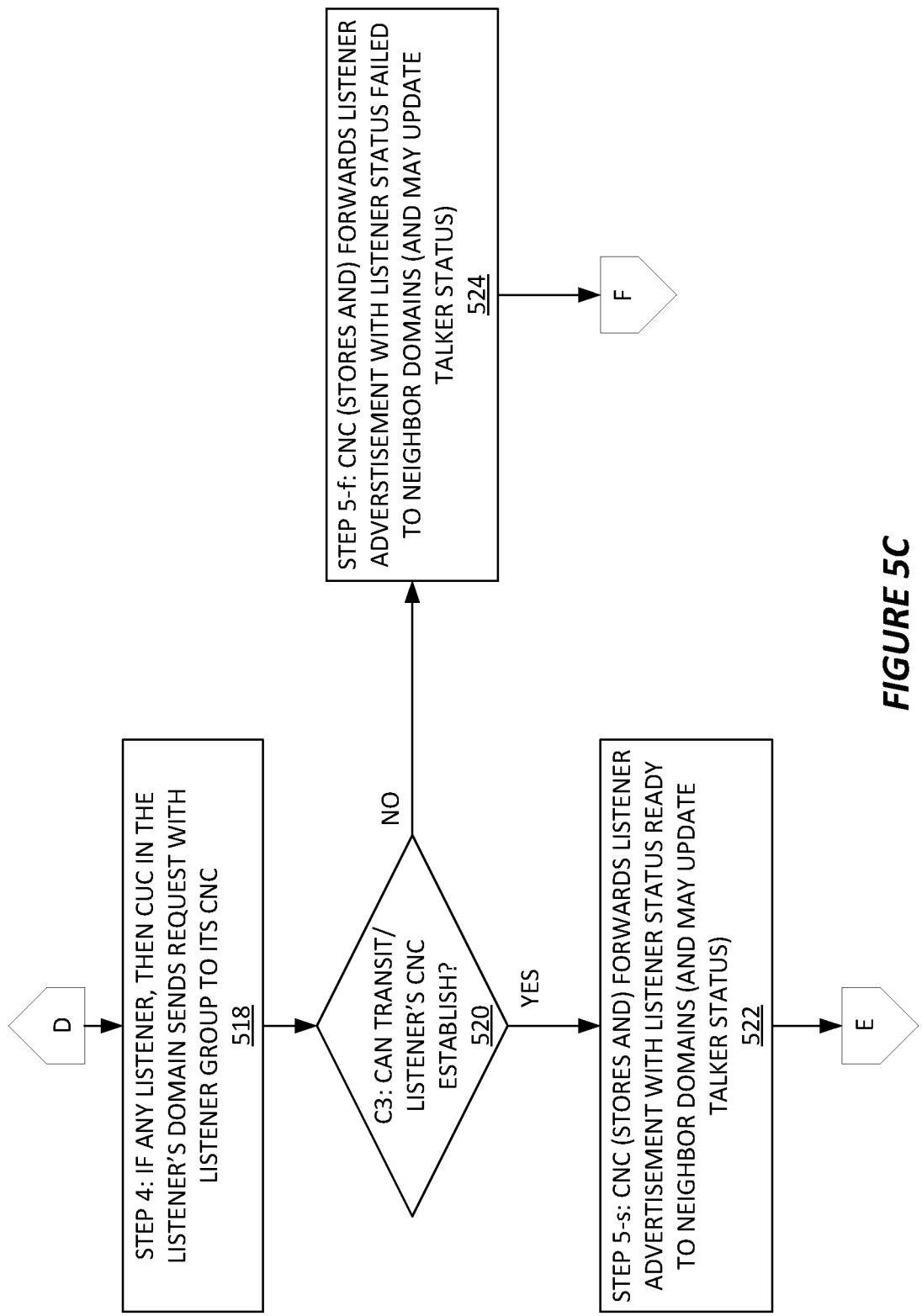
Figure 5D:
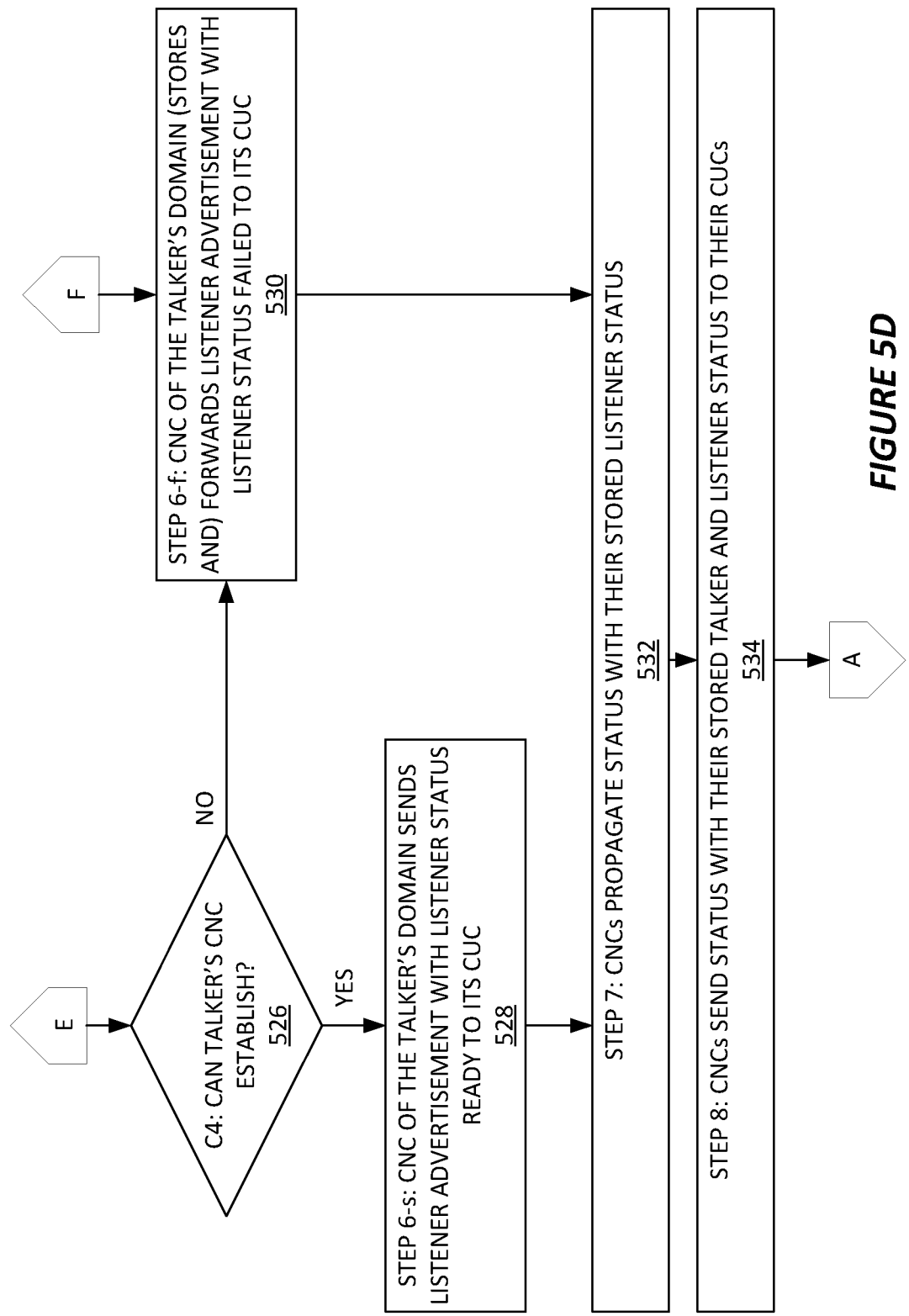

FIG. 5A depicts Step 1 (Block 502), Check 1 or "C1" (Block 504), Step 2-s-1 (Block 506) and Step 2-f-1 (Block 508). Here, the lowercase "s" denotes steps taken along the path associated with successful stream establishment and the lowercase "f" denotes the failure-path steps. FIG. 5B depicts Check 2 or "C2" (Block 510), Step 2-s-2 (Block 512), Step 2-f-2 (Block 514), and Step 3 (Block 516). FIG. 5C depicts Step 4 (Block 518), Check 3 or "C3" (Block 520), Step 5-s (Block 522), and Step 5-f (Block 524). Finally, FIG. 5D depicts Check 4 or "C4" (Block 526), Step 6-s (Block 528), Step 6-f (Block 530), Step 7 (Block 532), and Step 8 (Block 534).

Section 2.3 Successful Stream Establishment

Successful stream establishment is described in this section. That is, this portion of the discussion assumes that the "YES" branches of the checkpoints are followed in the flowchart shown in FIGS. 5A-D. The failure path through the method 500 is described in a subsequent section.

Section 2.3.1—Step 1

The establishment of a TSN stream starts with Step 1, where the CUC 32 of a Talker submits a Request to the CNC 34 in the same TSN domain 30. This Request includes at least a Talker group. The Request may also include Listener group(s), e.g., if there is Listener in the same TSN domain 30 or if pairing information for Listener(s) in remote domain(s) 30 was previously provided. As an example, assume that the CUC 32-3 sends a Request to the CNC 34-3 in the TSN Domain 30-3.

Section 2.3.2—Step 2

The Talker Advertisement is propagated among the CNCs 34 from the Talker's TSN domain 03 to the rest of the domains in Step 2. Basically, this is to inform each TSN domain 30 about the TSN stream and the Talker. The CNC 34 of the Talker's TSN domain 30 assembles the Talker Advertisement, i.e., includes the Talker group, the Status group, and the Domain ID. The Talker group of the Talker Advertisement is not changed when it is forwarded. The TalkerStatus in the Status group remains Ready if everything is all right with the establishment of the TSN stream, but it is changed from Ready to Failed by a CNC 34 that finds some problem related to stream establishment.

When assembling the Talker Advertisement, the CNC 34 of the Talker's TSN domain 30 sets TalkerStatus to Ready if the Talker end station 40 can be successfully connected to the network (see "C1" in Block 504 of FIG. 5A). Note that Status group also includes ListenerStatus, the value of which may be set to None to indicate no Listener detected.

In Step 2-s-1 (Block 506), the Talker Advertisement with TalkerStatus Ready is sent, via the inter-domain interfaces, to other TSN domains 30 that can be successfully connected to the Talker (i.e., the C1 check passed). The CNC 34 of the Talker's domain may include its own TSN Domain ID in the Talker Advertisement.

The CNCs 34 in the other TSN domains 30 propagate the Talker Advertisement on each inter-domain interface according to the pre-established inter domain communication path. (See Talker Advertisement content in Step 2-f-1 in Sections 2.3.9.1 and 2.3.9.2 for failed cases.)

Each of the other CNCs 34 store the Talker Advertisement and forward its towards other TSN domains 30 on each inter-domain interface according to the pre-established inter domain communication path apart from the one it has been received on. This is the simplest way of spreading a Talker Advertisement among all the TSN domains 30, which may be also referred to as flooding. It is beneficial for this type of operation if the preestablished inter-domain communication path is loop free. This operation can be enhanced if a CNC 34 not only stores and forwards but also filters the inter-domain configuration messages. Filtering can include not forwarding already received and forwarded inter-domain configuration messages, which is beneficial for maintaining loop-free inter-domain communication paths.

In addition, a CNC 34 may also (pre) book the resources that are needed to establish the TSN stream in its own TSN domain 30.

In Step 2-*s*-1, each CNC 34 of a transit TSN domain 30 stores and forwards the Talker Advertisement with TalkerStatus Ready via the applicable inter-domain interfaces, to other TSN domains 30 that can be successfully connected to the Talker (i.e., YES from C2). Each such transmit-domain CNC 34 may include its own TSN Domain ID in the Talker Advertisement as forwarded by it.

Note that a Listener's domain can also be a transit TSN domain 30 with respect to the propagation of the Talker Advertisement, as there may be further Listeners in other TSN domains 30. See the TSN domain 30-1 in the example shown in FIG. 4, which includes an end station 40-1 acting as a Listener but which also forwards Talker Advertisements from the TSN domain 30-3 on to the TSN domain 30-2.

Note that if pairing is applied in the deployment, and CNCs 34 are aware of the applied pairings, then a CNC 34 may perform an optimization by not sending the Talker Advertisement outside of its TSN domain 30, in case of an intra-domain TSN stream, i.e., when all the Listeners and the Talker are in the same TSN domain 30.

Among the various features of the CNCs 34 that are new as compared to conventional CNCs and with reference to FIG. 4, the CNC 34 in the TSN domain 30-3 sends a Talker Advertisement towards the TSN domain 30-1 and then the CNC 34 in the TSN domain 30-1 sends the Talker Advertisement towards TSN domain 30-2 in Step 2.

Section 2.3.3—Step 3

In Step 3, each CNC 34 in each TSN domain 30 that received the Talker Advertisement via inter-domain communications sends the Talker Advertisement unchanged to its own CUC 32, via the respective own-domain UNI. For example, the CNC 34 in the TSN domain 30-1 sends the Talker Advertisement to the CUC 32 in the TSN domain 30-1 (in addition to forwarding the Talker Advertisement to other TSN domains 30 as explained in Section 2.3.2, i.e., to the TSN Domain 30-2 in the example).

The respective CUCs 32 then inform their respective end stations 40 about the availability of the TSN stream from the Talker, as encoded in the Talker Advertisement. This is a new feature for the CUCs 32, in that they now can advertise the availability of Talkers in other centrally managed TSN domains 30. And, advantageously, they can provide those advertisements using the communication channel normally used to advertise intra-domain Talkers.

In the same way, the end stations 40 in any such TSN domain 30 can then inform the CUC 32 if they want to receive the TSN stream of the out-of-domain Talker. The CUC 32 does not need to perform this action if it is already aware of which end station(s) 40 should be Listener(s) for the TSN stream. Again, such information can be provided, e.g., by a priori pairing. By the end of Step 3, each CUC 32 in the TSN domains 30 external to the Talker know whether the given TSN stream should be established to any of its end stations 40. (Note that each of these CUCs 32 also get the Status of the Talker this way; it is either Ready or Failed.

Section 2.3.4—Step 4

The CUCs 32 that have an own-domain Listener that should receive the TSN stream submit a Request to their own CNC 34. This Request is as specified by 802.1Qcc. It may include both the Talker group and the Listener group(s), as are used in a single domain case, with the understanding that the convention single-domain case made no provisions for aggregating Ready/Failed statuses across multiple centrally managed TSN domains. It may be that the Request sent from each such CUC 32 only contains Listener group(s). For instance, the CUC 32 in the TSN domain 30-1 sends a Request to the CNC 34 in the TSN domain 30-1 and the CUC 32 in the TSN domain 30-2 sends a Request to the CNC 34 in the TSN domain 30-2, in the example context of FIG. 4.

Section 2.3.5—Step 5

Step 5-*s* is invoked after a CNC 34 receives a Request with Listener group. In Step 5, a Listener Advertisement is propagated among the CNCs 34 from the Listeners' TSN domains 30 to the Talker's TSN domain 30 via the transiting—interconnecting—TSN domains 30. One goal here is to perform or finalize the resource reservations for the TSN stream, i.e., establish it from the Talker to each given Listener.

The CNC 34 of each TSN domain 34 that includes one or more Listeners assembles the Listener Advertisement, i.e., includes the Listener group, the Status group, and the Domain ID. The Listener group describes the Listener, it is not changed when the Listener Advertisement is forwarded. The ListenerStatus in the Status group remains Ready if everything is all right with the establishment of the TSN stream (Steps C3 & 5-*s*), but it is changed from Ready to Failed by the CNC 34 in any involved TSN domain 30 that finds some problem related to stream establishment. (See Section 2.3.3 for failure cases.)

When assembling the Listener Advertisement, the CNC 34 of a Listener's TSN domain 30 sets ListenerStatus to Ready in the Status group if the Listener end station 40 can be successfully connected to the network (C3). Note that Status Group also includes TalkerStatus, whose value may be set to the one received in the Talker Advertisement. This way, the CNC 34 of the Talker's TSN domain 30 can be informed about what status the CNC 34 of a Listener's TSN domain 30 perceives. (This information can be then applied in the Status group sent in the Response from the CNC 34 to the CUC 32 in the Talker's domain. (Note that if the TalkerStatus gets flipped from Ready to Failed in any TSN domain 30 on the way from the Talker to the Listener, then the Talker will learn this way that stream establishment has failed somewhere.)

The CNC 34 of a Listener's TSN domain 30 then sends, via the inter-domain interfaces, a Listener Advertisement with ListenerStatus Ready, to other TSN domains 30 that can be successfully connected to the Talker (i.e., C3 passed). The CNC 34 may include its own TSN Domain ID in the Listener Advertisement.

The CNCs 34 of transit TSN domains 30 store and forward, via the inter-domain interfaces, the Listener Advertisement with ListenerStatus Ready to other TSN domains 30 that can be successfully connected to the Talker (i.e., C3 passed). (The distribution process of Talker Advertisements and its enhancements described in Section 2.3.2 are applicable to the distribution of Listener Advertisements as well.) Each such forwarding CNC 34 may include its own TSN Domain ID in the Talker Advertisement. In addition, each such CNC 34 reserves the resources that are needed to establish the TSN stream in its own respective TSN domain 30.

Regarding example new features for the CNCs 34, FIG. 4 illustrates the CNC 34 in the TSN domain 30-1 and the CNC 34 in the TSN domain 30-2 sending Listener Advertisements to TSN Domain 30-3, corresponding to Step 5-*s*.

Section 2.3.6—Step 6

The CNC 34 of a Talker's TSN domain 30 may send the Listener Advertisement to its own CUC 32. Thus, the Talker's CUC 32 becomes aware of detailed information on the Listeners in the other TSN domains 30. Obtaining other-domain Listener information based on the end-to-end propagation of such information through the involved other TSN domains 30 may provide more detailed information than would be provided simply by configuring pre-pairing information.

Section 2.3.7—Step 7

At Step 7, status messages with Status group may be sent from the CNC 34 of a Talker's TSN domain 30 towards the TSN domain 30 of a Listener along the pre-established inter domain communication path. This Status group includes the ListenerStatus that the CNC 34 of the Talker's Listener domain learned and stored. When received at a Listener's TSN domain 30, the Status message informs the CNC 34 of the Listener's TSN domain 30 of the end result of the status of the Listener after traversing through the various other TSN domains 30 that couple the Talker to the Listener. (Note that if that status gets flipped from Ready to Failed in any TSN domain 30 on the way from the Listener to the Talker, then the Listener will learn that stream establishment has failed somewhere.)

Section 2.3.8—Step 8

At Step 8, CNCs 34 send Status with their stored Talker and Listener Status to their respective own-domain CUCs 32. Note that Step 8 equals a Response from the CNC 34 to the CUC 32 via the UNI as specified by 802.1Qcc. The difference in the context of Step 8 is that a CNC 34 learns information to be put in this Response from the inter-domain configuration information that is communicated by the method described herein.

Section 2.3.9—Failure Cases

Section 2.3.9.1—Talker Failed in Talker's Domain

It may be that a TSN stream cannot be established in a Talker's own TSN domain 30 for some reason, e.g., the connection between the Talker and the network—the bridges 36 and/or interfaces associated therewith—is broken, or own-domain resources are not available.

Checkpoint 1 (C1) illustrates such checking. Particularly, the CNC 34 of a Talker's own domain checks whether the TSN stream can be established from the Talker's perspective, e.g., whether the Talker's connection to the network is all right and whether the connection and resources are available from the Talker to the inter-domain interface that is used to couple the Talker's own TSN domain 30 to other TSN domains 30.

Step 2-*f*-1 illustrates actions taken if the CNC 34 in the Talker's own TSN domain 30 cannot establish the TSN stream within its own TSN domain 30. If the stream cannot be established within the own domain, the CNC 34 stores that the Talker is Failed and communicates Talker Failed to its CUC 32. In Step 8, the CNCs 32 communicate the status information gathered and stored. The Status group may include information on the problematic interface, e.g., inter-domain interface. The interface may be encoded in the FailedInterfaces group as specified in subclause 46.2.5.4 of 802.1Qcc.

Step 2-*f*-2 follows Step 2-*f*-1 and in it CNCs 32 in the involved TSN domains 30 then distribute the Talker Advertise such that TalkerStatus is Failed in the Status group. The Talker Advertise then gets to each Listener such that TalkerStatus is Failed as described in Section 2.3.3. The method then continues with TalkerStatus Failed from Step 3 (see Section 2.3.3).

Section 2.3.9.2 Talker Failed in Transit Domain or Listener's Domain

Checkpoint 2 (C2) is a check on whether the CNC 34 in each TSN domain 30 that includes one or more Listeners for the TSN stream can establish the own-network resources and connections needed to carry the TSN stream. Step 2-*f*-2 is performed at/by each such CNC 34 that cannot establish the TSN stream within its own domain. According to Step 2-*f*-2, such CNCs 34 distribute the Talker Advertise such that TalkerStatus is Failed in the Status group. Note that in such case, a CNC 34 of a transit TSN domain 30 overrides TalkerStatus to Failed if needed. The Talker Advertise then gets to each Listener with the TalkerStatus set as Failed, as described in Section 2.3.3. The method 500 then continues with TalkerStatus Failed from Step 3 (see Section 2.3.3).

2.3.9.3-Listener Failed in Transit or Listener's Domain

It may be that the TSN stream cannot be established in a Listener's TSN domain 30 or in a transmit TSN domain 30 for some reason, e.g., connection between the Listener and the network is broken, or resources are not available. Checkpoint 3 (C3) accounts for this possible failure.

The CNC of a Listener's TSN domain 30 checks whether the TSN stream can be established from the Listener's perspective, e.g., whether the Listener's connection to the network is all right and whether or not the connection and resources are available between the Listener and inter-domain interface. The CNCs 34 of the transit TSN domains 30 each check whether the TSN stream can be established in their respective TSN domains for the given Listener.

Step 5-*f* illustrates the failure case in which a transit or Listener's TSN domain 30 cannot establish the TSN stream. In the case of failure in a Listener's domain, the CNC 34 in that domain stores that the Listener is Failed and communicates Listener Failed to its CUC 32 when it gets there. In Step 8, the involved CNCs 34 communicate the status information gathered and stored. The Status group may include information on the problematic interface, e.g., inter-domain interface. The interface may be encoded in the FailedInterfaces group as specified in subclause 46.2.5.4 of 802.1Qcc. The CNCs 34 then distribute the Listener Advertise such that ListenerStatus is Failed in the Status group. Note that in such case, a CNC 34 of a transit TSN domain 30 overrides ListenerStatus to Failed if needed. The Listener Advertise then gets to the Talker such that ListenerStatus is Failed, as described in section. The method then continues with ListenerStatus Failed from Step 7 (see Section 2.3.7).

2.3.9.9—Listener Failed in Talker's Domain

Checkpoint 4 (C4) indicates a check performed by the CNC 34 of the Talker's TSN domain 30, where the CNC 34 checks whether the TSN stream can be established for the given Listener in the Talker's TSN domain 30. If not, as shown in Step 6-f, the CNC 34 in the Talker's TSN domain 30 sends the Listener Advertisement with Listener Status Failed to its CUC 32. The method then continues with ListenerStatus Failed from Step 7 (see Section 2.3.7).

Section 2.4—Further Aspects

Note that the TSN stream establishment method presented herein aims to maximize the information made available to the various components, e.g., provides detailed information on the Listener. Therefore, a three-way information propagation is included in the method in one or more embodiments. See FIG. 4, where a first part of the three-way information propagation is denoted by the arrows marked with the number "2", the second part is denoted by the arrows marked with the number "5", and the third part is denoted by the arrows marked with the number "7". Also, note that, if desired, then some simplifications may be made, e.g., skip the last information propagation about Status and use, e.g., a timeout mechanism instead (e.g., if no Failed status is received, then the assumption is that establishment was successful across the interconnected TSN domains 30).

The above-described method 500 can be invoked repeatedly in order to refresh a TSN stream, e.g., to make it sure that it is alive, and resources are reserved for it. In various method embodiments described herein, a TSN stream can be torn down by propagating Leave information along a pre-established inter domain communication path. This operation can be triggered by the Talker, or a Listener, or their CUCs 32. A Leave initiated by the Talker's side tears down the entire TSN stream and can be encoded as described in subclause 46.2.3 in 802.1Qcc. Leave initiated by the Listener's side only tears down the reception of the TSN stream by the given Listener (but not for other Listeners) and can be encoded as described in subclause 46.2.4 in 802.1Qcc. Leave can be propagated similar to Talker Advertisement or Listener Advertisement. The resources reserved for a TSN stream are freed up when it is torn down, i.e., as a consequence of Leave.

The method(s) described herein are also applicable if inter-domain interfaces considered and handled such that they are virtual interfaces connecting end stations 40 residing in remote TSN domains 30. Note that a "virtual interface" represents communications transceiving operations— sending and receiving—implemented via virtualized hardware; nonetheless, virtualized hardware is, at bottom, instantiated on underlying physical hardware.

A cloud, edge cloud, (data center), may act as a TSN domain 30, i.e., act as any other TSN domain 30 described herein. A cloud can have its own CNC 34 and CUC 32. Therefore, the TSN inter-domain configuration method described herein is also applicable in a cloud environment, e.g., when a TSN deployment includes cloud-based resources and encompasses cloud-based CNCs 34 and CUCs 32.

Figure 6:
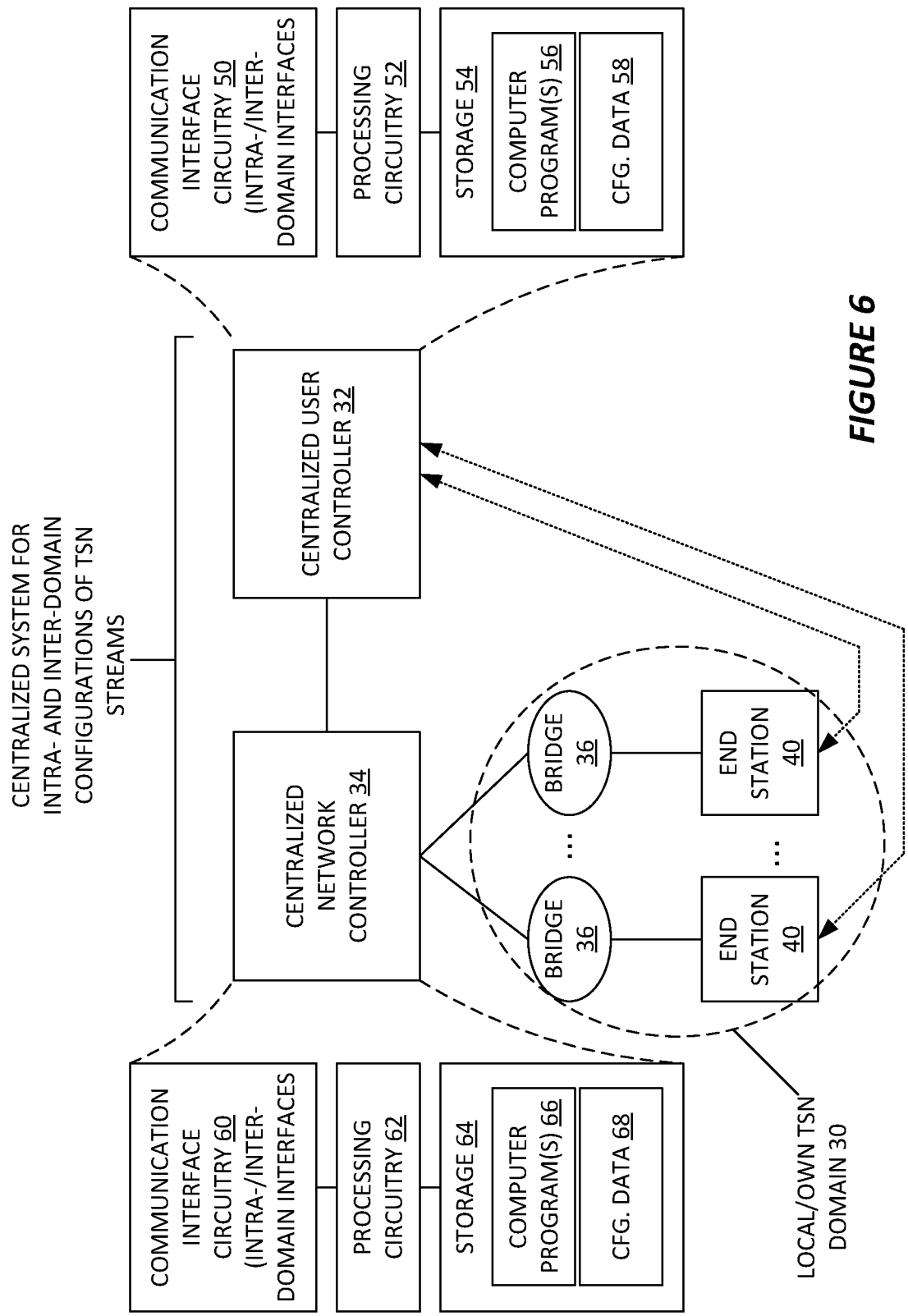
FIG. 6 is a block diagram of example details for implementation of a centralized network controller and a centralized user controller of a centrally managed TSN domain that supports inter-domain TSN streams.

With the above example details in mind, FIG. 6 illustrates a centralized system for intra-and inter-domain configurations of TSN streams, according to one or more embodiments. Among its other advantages, the system cooperates with other like or similar systems to provide for inter-domain TSN streams between respective TSN domains 30 that each use a centralized configuration model that allows for simpler end stations 40 within the respective TSN domains 30, or at least allow for the end stations 40 to omit the processing and communication support that would be needed if they were responsible for handling the TSN configurations needed to permit TSN streams to be transmitted or received across different TSN domains 30.

The example system includes a centralized user controller 32 that, in one or more embodiments, implements the "Centralized User Configuration" (CUC) operations described in IEEE 802.1Qcc-2018. The example system further includes a centralized network controller 34 that, in one or more embodiments, implements the "Centralized Network Configuration" (CNC) operations described in IEEE 802.1Qcc-2018. Unless otherwise noted or obvious from the context, "CNC" and "CUC" as used herein refer to entities that provide the inter-domain handling of TSN streams as described herein, rather than the existing CNC and CUC described in IEEE 802.1Qcc-2018.

Among the advantageous processing configurations and corresponding operations performed by the CNC 34 is cooperating with the CUC 32 to configure the bridges 16 (or, more generally, network resources) within a local TSN domain 30, for inter-domain TSN streams going to or from one or more other similarly centralized TSN domains 30. Configuring inter-domain TSN streams going to or from the one or more other similarly centralized TSN domains 30 involves the CNC 34 using inter-network interfaces to communicate with CNCs 34 in the other TSN domains 30, which allow the respective CNCs 34 to share information about the talkers and listeners local to their respective TSN domains 30. In this respect, each such CNC 34 communicates with its (local) CUC 32 to obtain listener/talker information for the end stations 40 that are local to its own TSN domain 30 and communicates with the other CNCs 34 to obtain such information for the other TSN domains 30.

In an example embodiment, the CUC 32 comprises processing circuitry 52 that is operatively associated with communication interface circuitry 50. The communication interface circuitry comprises one or more types of communication interfaces, e.g., for sending and receiving signals via a physical medium—wired or wireless—and for generating such signaling according to the applicable communication protocols and timing. The example communication interface circuitry 50 communicatively couples the CUC 32 to the CNC 34 and to end stations 40 (or to entities in communication with end stations 40) within the local TSN domain 30. As a non-limiting example, the communication interface circuitry 50 comprises one or more Ethernet interfaces or other data-networking interfaces.

The processing circuitry 52 of the CUC 32 comprises fixed circuitry or programmatically configured circuitry, or some combination of fixed and programmatically configured circuitry. In at least one embodiment, the CUC 32 includes storage 54—one or more types of computer-readable media providing at least temporary storage of information. In an example embodiment, the storage 54 comprises any one or more of SRAM, DRAM, FLASH, EEPROM, Solid State Disk (SSD), or electromagnetic storage systems.

Broadly, in one or more embodiments, the processing circuitry 52 comprises one or more processors (e.g., any one or more or mix of microprocessors, microcontrollers, DSPs, ASICs, FPGAs, CPLDs, etc.). In at least one example embodiment, the processing circuitry 52 comprises one or more general-purpose processors that is/are specially adapted via the execution of computer program instructions, the execution of which cause the CUC 32 to carry out the operations described herein for configuring intra-and inter-domain TSN streams.

In such embodiments, the storage 54 contains one or more computer programs 56 comprising the above-described computer program instructions. For example, the storage includes non-volatile storage for longer-term storage of the computer program(s) 56 and volatile storage for holding the instructions for program execution and other run-time information used by the processing circuitry 52. In at least one such embodiment, at least part of the storage 54, e.g., working memory and cache memory, may be integrated with the one or more processors comprising the processing circuitry 52 of the CUC 32. The storage 54 also may hold various types of configuration data 58 used or generated by the CUC 32.

In an example embodiment, a CNC 34 comprises processing circuitry 62 that is operatively associated with communication interface circuitry 60. Here, "operatively associated" indicates that signaling—such as defined protocol messages or other information—incoming to the communication interface circuity 60 is passed to the processing circuitry 62 for processing, and that signaling outgoing from the processing circuitry 62 destined for other entities in or outside of the local TSN domain 30 goes to the communication interface circuitry 60 for transmission. Transmission and reception operations by the communication interface circuitry 60 may or may not include encapsulation/de-encapsulation, modulation/demodulation, etc.

The communication interface circuitry 60 comprises one or more types of communication interfaces, e.g., for sending and receiving signals via a physical medium—wired or wireless—and for generating such signaling according to the applicable communication protocols and timing. The example communication interface circuitry 60 communicatively couples the CNC 34 to the CUC 32 and to network resources (e.g., bridges 36) within the local TSN domain 30, and further couples the CNC 34 to one or more other CNCs 34 in respective other TSN domains 30 via an inter-network interface—e.g., the inter-domain interfaces shown in FIG. 4. As a non-limiting example, the communication interface circuitry 60 comprises one or more Ethernet interfaces or other data-networking interfaces.

The processing circuitry 62 of the CNC 34 comprises fixed circuitry or programmatically configured circuitry, or some combination of fixed and programmatically configured circuitry. In at least one embodiment, the CNC 34 includes storage 64—one or more types of computer-readable media providing at least temporary storage of information. In an example embodiment, the storage 64 comprises any one or more of SRAM, DRAM, FLASH, EEPROM, Solid State Disk (SSD), or electromagnetic storage systems.

Broadly, in one or more embodiments, the processing circuitry 62 comprises one or more processors (e.g., any one or more or mix of microprocessors, microcontrollers, Digital Signal Processors (DSPs), Application Specific Integrated Circuits (ASICs), Field Programmable Gate Arrays (FPGAs), Complex Programmable Logic Devices (CPLDs), etc.). In at least one example embodiment, the processing circuitry 62 comprises one or more general-purpose processors that is/are specially adapted via the execution of computer program instructions, the execution of which cause the CNC 34 to carry out the operations described herein for configuring intra-and inter-domain TSN streams.

In such embodiments, the storage 64 contains one or more computer programs 66 comprising the above-described computer program instructions. For example, the storage 64 includes non-volatile storage for longer-term storage of the computer program(s) 66 and volatile storage for holding the instructions for program execution and other run-time information used by the processing circuitry 62. In at least one such embodiment, at least part of the storage 64, e.g., working memory and cache memory, may be integrated with the one or more processors comprising the processing circuitry 62 of the CNC 34. The storage 64 also may hold one or more types of configuration data used or generated by the CNC 34.

Figure 7:
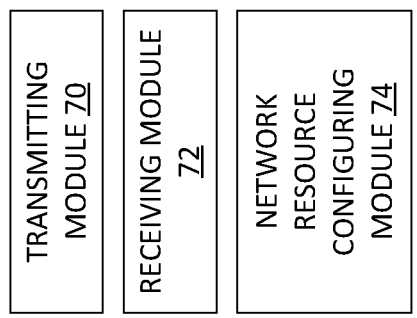

FIG. 7 illustrates another embodiment of a CNC 34, where its operations are performed by functional units referred to as processing units or processing modules, which may be implemented directly using physical processing resources or may be implemented indirectly using virtualized processing resources instantiated on underlying physical processing resources. The processing units include a transmitting module 70 configured to transmit messages or signaling associated with carrying out the CNC operations described herein, a receiving module 72 configured to receive messages or signaling associated with carrying out the CNC operations described herein, and a network resource configuring module 74 configured to carry out network operations associated with reserving, allocating, and otherwise managing network resources and connections for the operations described herein.

Figure 8:
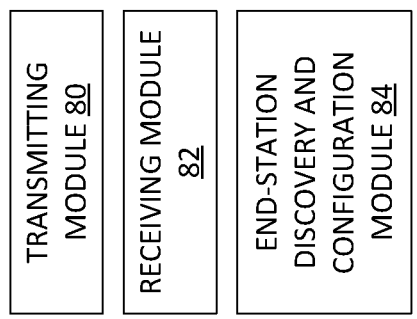
FIGS. 7 and 8 are block diagrams of further example implementations of a centralized network controller and a centralized user controller.

FIG. 8 illustrates another embodiment of a CUC 32, where its operations are performed by functional units referred to as processing units or processing modules, which may be implemented directly using physical processing resources or may be implemented indirectly using virtualized processing resources instantiated on underlying physical processing resources. The processing units include a transmitting module 80 configured to transmit messages or signaling associated with carrying out the CUC operations described herein, a receiving module 82 configured to receive messages or signaling associated with carrying out the CUC operations described herein, and an end-station discovery and configuration module 84 configured to carry out network operations associated with discovering, configuring, and otherwise managing own-domain end stations 40 for the operations described herein.

Figure 9:
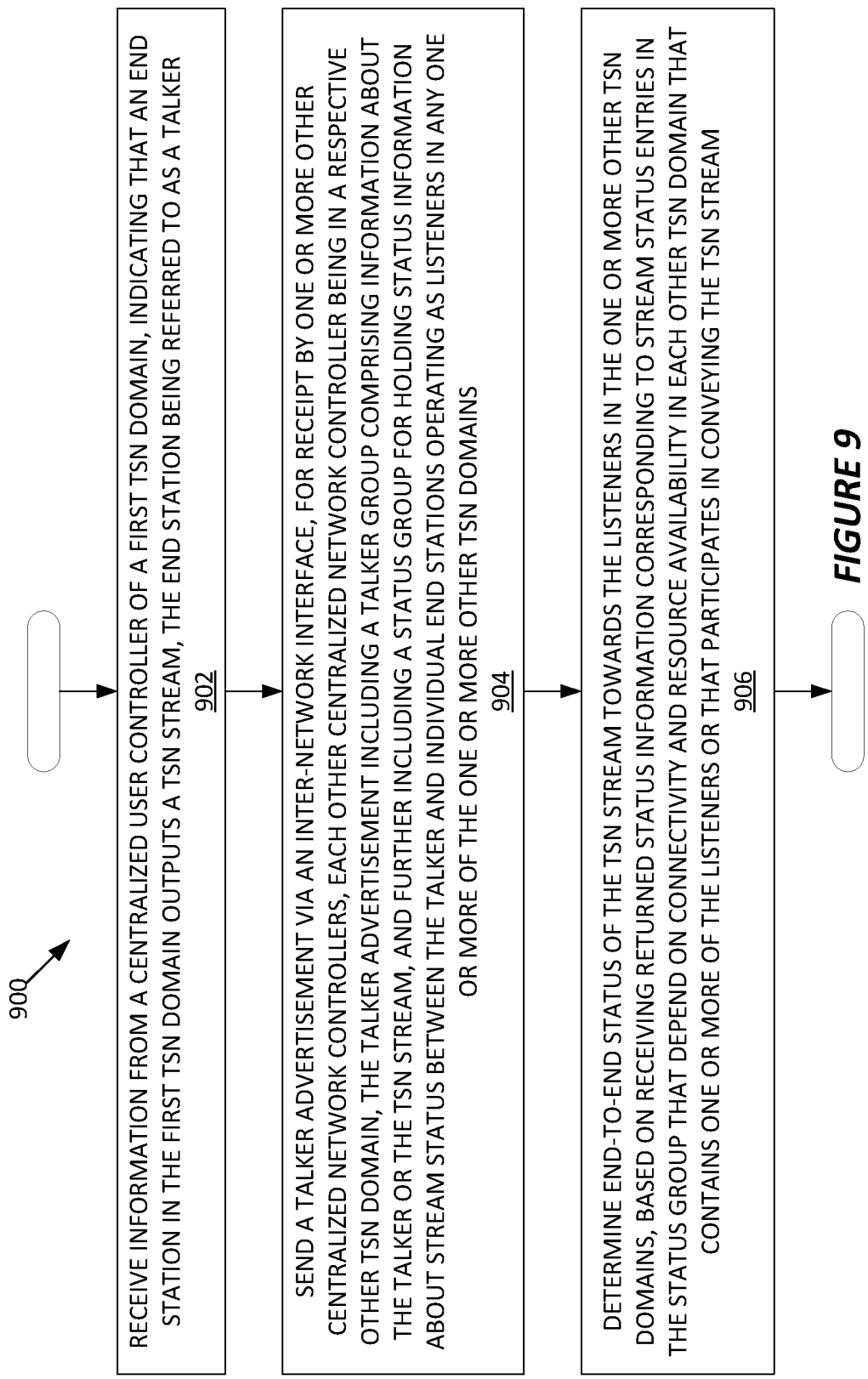
FIG. 9 is a logic flow diagram of a method of operation by a centralized network controller of a TSN domain that is configured for intra-and inter-domain TSN streams.

FIG. 9 illustrates another example, method 900 performed by a CNC 34 in a first TSN domain 30 according to one embodiment. The method 900 may be understood as being a subset of the overall operations detailed in the method 500.

The method 900 includes:
receiving (Block 902) information from a centralized user controller 32 of the first TSN domain 30, indicating that an end station 40 in the first TSN domain 30 outputs a TSN stream, the end station 40 being referred to as a talker;

sending (Block 904) a talker advertisement via an inter-network interface (communicatively coupling respective domains), for receipt by one or more other centralized network controllers 34, each other centralized network controller 34 being in a respective other TSN domain 30, the talker advertisement including a talker group comprising information about the talker or the TSN stream, and further including a status group for holding status information about stream status between the talker and individual end stations 40 operating as listeners in any one or more of the one or more other TSN domains 30; and determining (Block 906) end-to-end status of the TSN stream towards the listeners in the one or more other TSN domains 30, based on receiving returned status information corresponding to stream status entries in the status group that depend on connectivity and resource availability in each other TSN domain 30 that contains one or more of the listeners or that participates in conveying the TSN stream.

Figure 10:
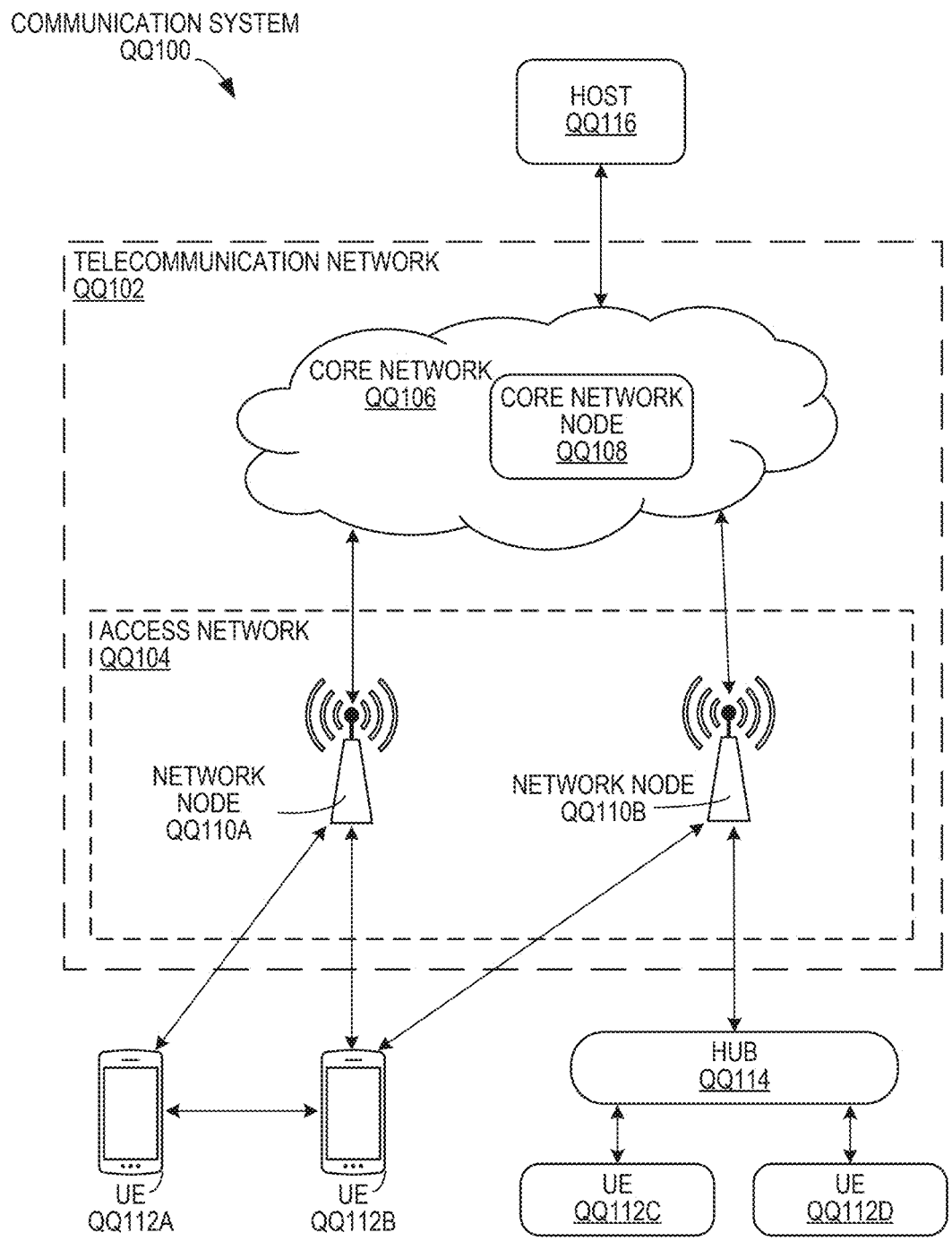
FIG. 10 is a block diagram depicting an example of a communication system in accordance with some embodiments.

FIG. 10 shows an example of a communication system QQ100 in accordance with some embodiments, such as where the communication system QQ100 includes or communicatively interfaces two or more centrally managed TSN domains 30.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110a and QQ110b (one or more of which may be generally referred to as network nodes QQ110), or any other similar 3rd Generation Partnership Project (3GPP) access node or non-3GPP access point. The network nodes QQ110 facilitate direct or indirect connection of user equipment (UE), such as by connecting UEs QQ112a, QQ112b, QQ112c, and QQ112d (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102 and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. QQ1 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. In at least one example embodiment, the telecommunication network is a 5G or other cellular network that provides wireless connectivity for one or more TSN domains that use the centralized configuration model, e.g., between end stations and bridges and/or between bridges. In such embodiments, the telecommunication network includes or is associated a centralized network controller and an associated centralized user controller operating in each respective TSN domain.

Further, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs. In at least one embodiment, the telecommunications network QQ102 provides connectivity for industrial devices operating as end stations in one or more TSN domains based on the centralized configuration model.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single-or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio—Dual Connectivity (EN-DC).

In the example, the hub QQ114 communicates with the access network QQ104 to facilitate indirect communication between one or more UEs (e.g., UE QQ112c and/or QQ112d) and network nodes (e.g., network node QQ110b). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular if one or more of the UEs are low energy IoT devices.

The hub QQ114 may have a constant/persistent or intermittent connection to the network node QQ110b. The hub QQ114 may also allow for a different communication scheme and/or schedule between the hub QQ114 and UEs (e.g., UE QQ112c and/or QQ112d), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110b. In other embodiments, the hub QQ114 may be a non-dedicated hub—that is, a device which is capable of operating to route communications between the UEs and network node QQ110b, but which is additionally capable of operating as a communication start and/or end point for certain data channels.

Figure 11:
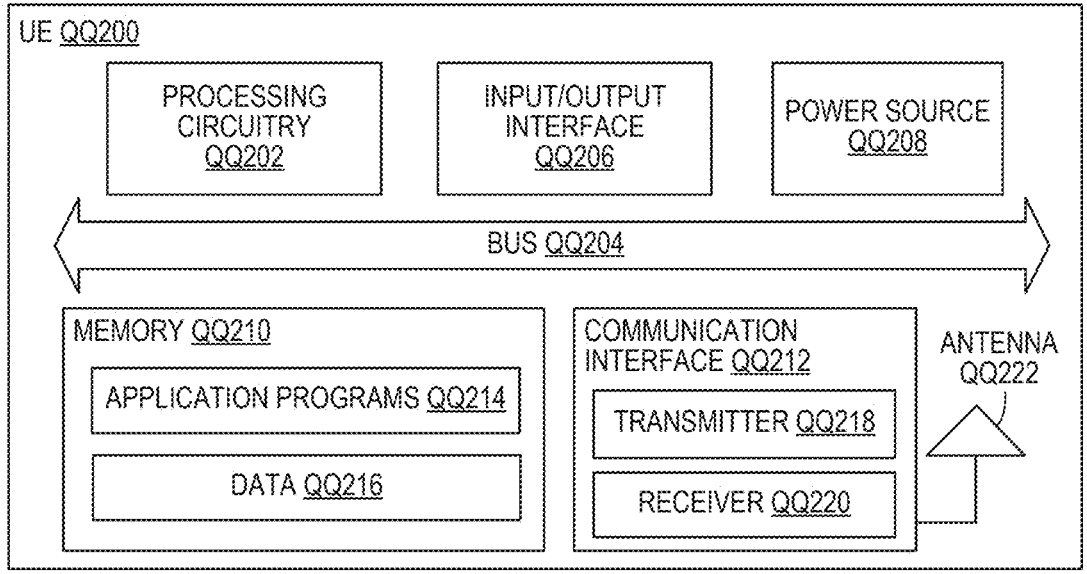
FIG. 11 is a block diagram depicting an example User Equipment (UE) in accordance with some embodiments.

FIG. 11 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal-or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 11.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
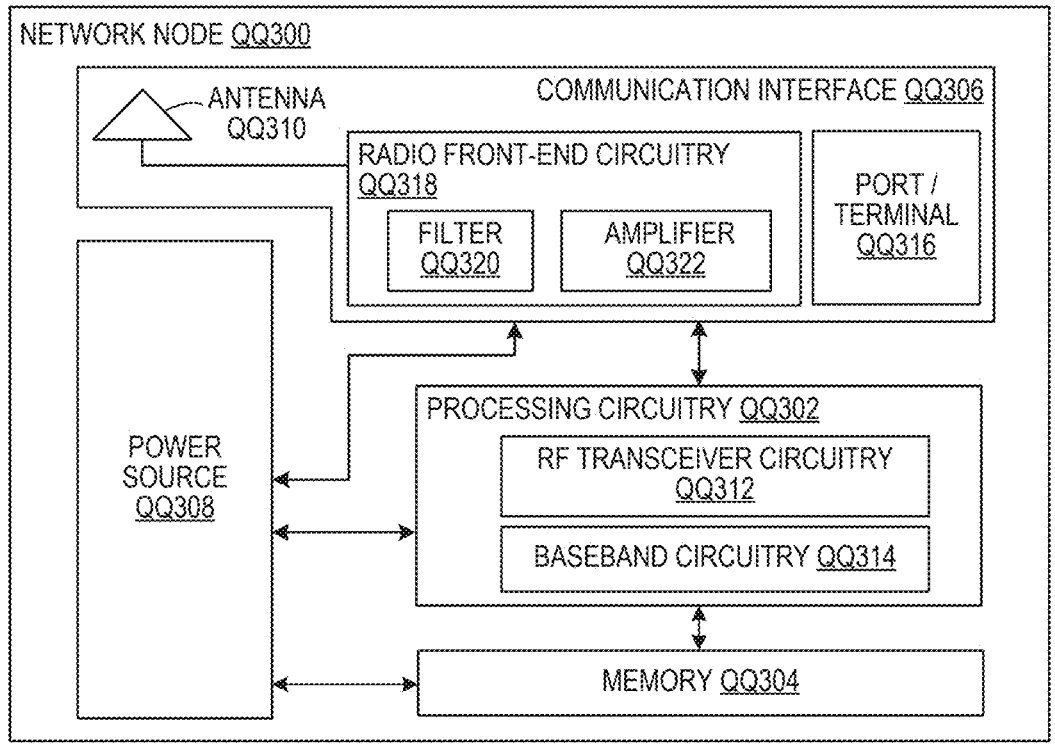
FIG. 12 is a block diagram depicting an example network node of a communication system in accordance with some embodiments.

FIG. 12 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 12 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 13:
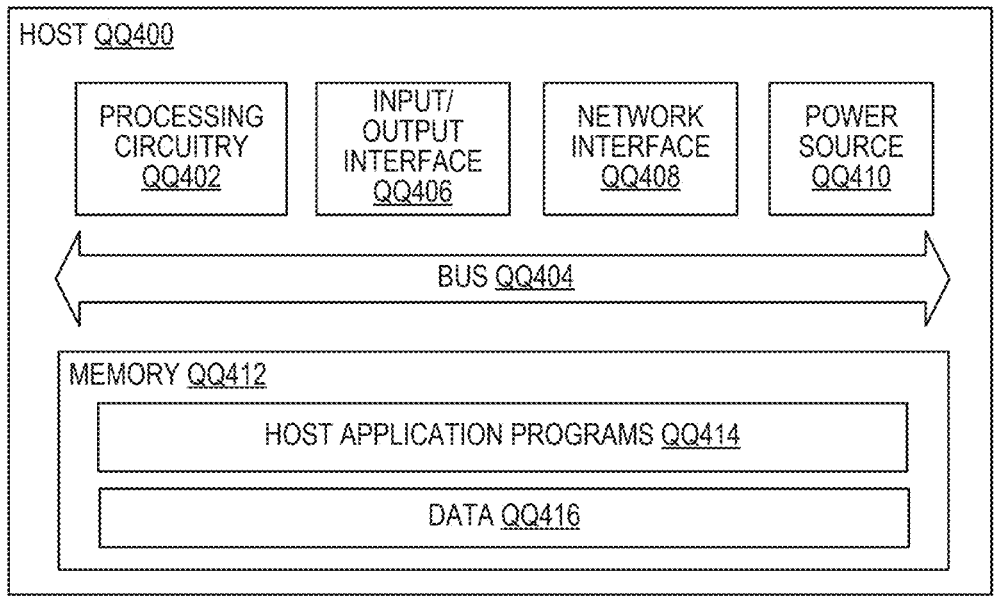
FIG. 13 is a block diagram depicting an example host in accordance with some embodiments.

FIG. 13 is a block diagram of a host QQ400, which may be an embodiment of the host QQ116 of FIG. 10, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 11 and 12, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400, or data generated by the host QQ400 for a UE. Embodiments of the host QQ400 may utilize only a subset, or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
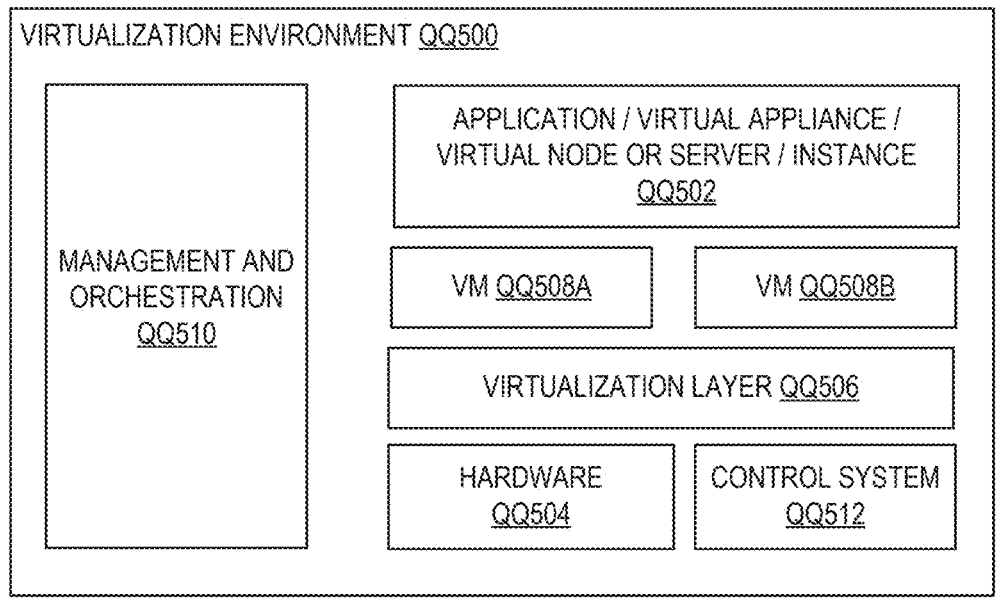
FIG. 14 is a block diagram depicting a virtualization environment in which functions implemented by some embodiments may be virtualized.

FIG. 14 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs. forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g., such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 15:
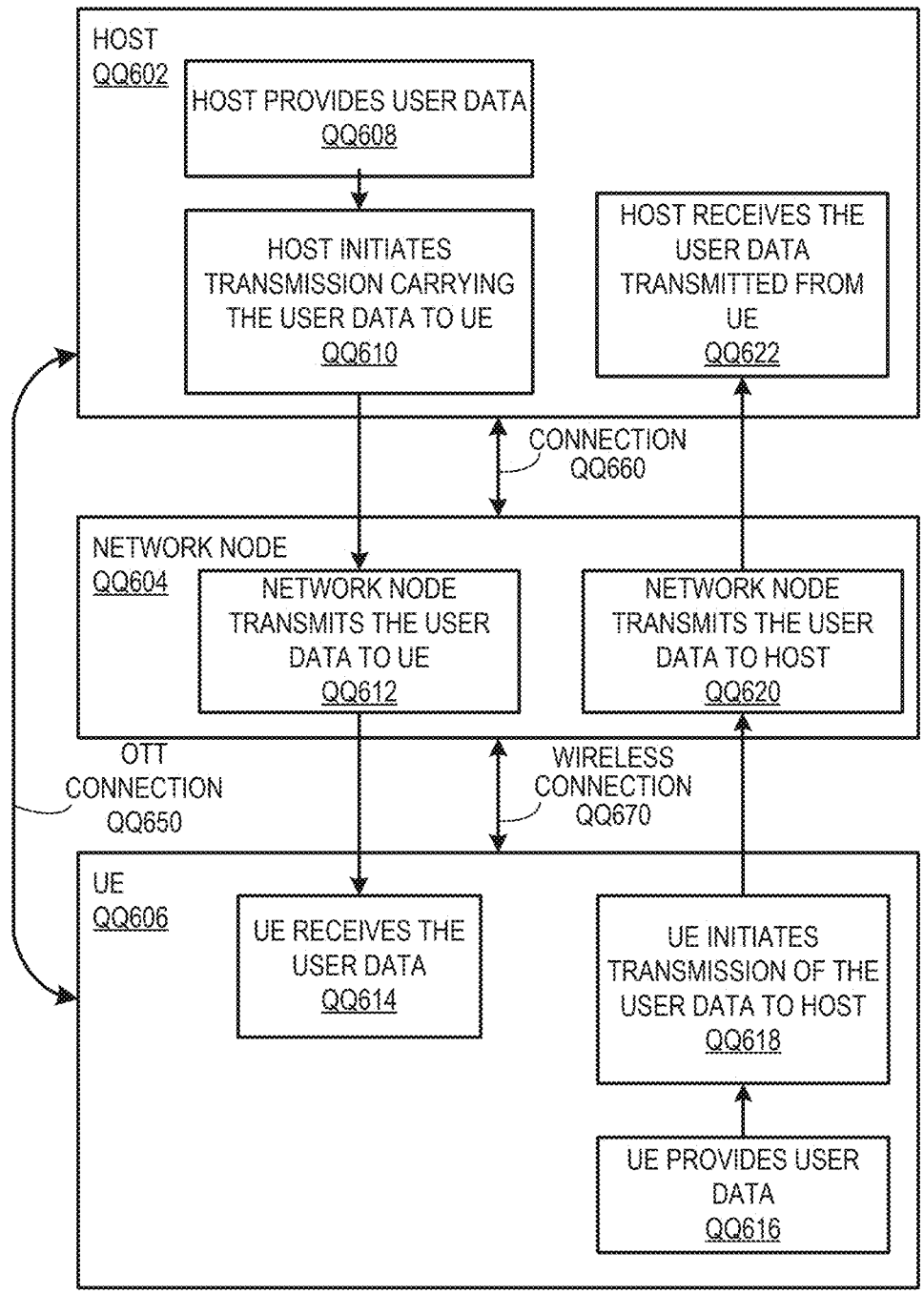
FIG. 15 is a block diagram depicting a communication diagram of a host communicating via a network node with a UE over a partially wireless connection in accordance with some embodiments.

FIG. 15 shows a communication diagram of a host QQ602 communicating via a network node QQ604 with a UE QQ606 over a partially wireless connection in accordance with some embodiments. Example implementations, in accordance with various embodiments, of the UE (such as a UE QQ112a of FIG. 10 and/or UE QQ200 of FIG. 11), network node (such as network node QQ110a of FIG. 10 and/or network node QQ300 of FIG. 12), and host (such as host QQ116 of FIG. 10 and/or host QQ400 of FIG. 13) discussed in the preceding paragraphs will now be described with reference to FIG. 15.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 10) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve the deterministic timing of communications and thereby provide benefits such as better responsiveness, the ability to meet precise communication timing, e.g., in industrial automation network domains that use TSN for critical control-and-monitoring related applications that use one or more wireless communication links provided by the network.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole, and/or by end users and a wireless network generally.

EMBODIMENTS

Group A Embodiments

1. A method of operation by a centralized network controller in a first Time-Sensitive Networking (TSN) domain, the method comprising:
configuring network resources of the first TSN domain to support intra-domain TSN streams going between end stations local to the first TSN domain, based on intra-domain configuration information provided to the centralized network controller via a local centralized user controller that belongs to the first TSN domain and communicates with the end stations local to the first TSN domain;
exchanging inter-domain configuration information with a second centralized network controller belonging to a second TSN domain, the inter-domain configuration information exchanged via an inter-network interface that directly or indirectly couples the centralized network controller with the second centralized network controller; and
configuring the network resources of the first TSN domain to support inter-domain TSN streams between one or more of the end stations local to the first TSN domain and one or more end stations local to the second TSN domain, based on the inter-domain configuration information.

2. The method of embodiment 1, wherein exchanging the inter-domain configuration information includes sending information advertising talker end stations local to the first TSN domain, for use by the second centralized network controller and a corresponding local centralized user controller in the second TSN domain, to determine whether there are any end stations local to the second TSN domain interested in listening to the corresponding TSN stream of any of the advertised talker end stations local to the first TSN domain.

3. The method of embodiment 2, wherein exchanging the inter-domain configuration information comprises receiving return information indicating whether there are any end stations local to the second TSN domain interested in listening to the corresponding TSN stream of any of the advertised talker end stations local to the first TSN domain, and wherein, responsive to there being one or more end stations local to the second domain that are interested in listening, configuring the network resources of the first TSN domain for sending the corresponding TSN stream(s) towards the second TSN domain.

4. The method of any of embodiments 1-3, wherein exchanging the inter-domain configuration information includes receiving information advertising talker end stations local to the second TSN domain, and wherein the method further comprises the centralized network controller indicating the advertised talker end stations local to the second TSN domain to the local centralized user controller, for determination by the local centralized user controller as to whether any end stations local to the first TSN domain are interested in listening to the corresponding TSN stream of any the advertised talker end stations local to the second TSN domain.

5. The method of embodiment 4, further comprising, responsive to the local centralized user controller indicating that there are one or more end stations local to the first TSN domain interested in listening to the corresponding TSN stream of any of the advertised talker end stations local to the second TSN domain, configuring the network resources of the first TSN domain for providing the corresponding TSN stream(s) to the interested end stations local to the first TSN domain.

6. The method of any of embodiments 1-5, wherein exchanging the inter-domain configuration information comprises sending a talker advertisement towards the second centralized network controller via the inter-network interface, the talker advertisement comprising a talker group and a status group, wherein the talker group contains information for a particular end station local to the first TSN domain that is operative as a talker to output a corresponding TSN stream, and the status group provides the status of the corresponding TSN stream as between the particular end station and each end station that is interested in listening to the corresponding TSN stream and is local to the second TSN domain or any further TSN domain.

7. The method of embodiment 6, wherein the method includes the centralized network controller allowing the second centralized network controller or any further centralized network controller of any intervening or further TSN domain between the first TSN domain and the second TSN domain to fill in status information in the status group according to connectivity status in the second TSN domain or any intervening or further TSN domain.

8. The method of embodiment 1, wherein exchanging the inter-domain configuration information comprises sending a listener advertisement towards the second centralized network controller via the inter-network interface, the listener advertisement comprising one or more listener groups and corresponding status groups, each listener group corresponding to a respective end station local to the first TSN domain, and each corresponding status group indicating the status of a TSN stream between each respective end station local to the first TSN domain and an end station in the second TSN domain that provides the TSN stream.

9. The method of embodiment 8, wherein the method includes the centralized network controller allowing the second centralized network controller or any further centralized network controller of any intervening TSN domain between the first TSN domain and the second TSN domain to fill in status information in each corresponding status group that depends on connectivity status and available resources in the second TSN domain or any intervening TSN domain.

10. The method of any of embodiments 1-9, wherein the method further comprises the centralized network controller filtering information outgoing from the centralized network controller on the inter-network interface, to remove one or more types of domain-specific information that are private to the first TSN domain.

11. The method of any of embodiments 1-10, wherein the first and second TSN domains are among a plurality of interconnected TSN domains that exchange respective items of inter-domain configuration information, and wherein the method further comprises the centralized network controller preventing repeated forwarding of a same item of inter-domain configuration information on its outgoing inter-network interface.

12. A method of operation by a first centralized network controller in a first Time-Sensitive Networking (TSN) domain, the method comprising:
configuring network resources of the first TSN domain to support intra-domain TSN streams between respective end stations in the first TSN domain operating as respective listeners or talkers, responsive to a first centralized user controller in the first TSN domain providing listener and talker information to the first centralized network controller; and
configuring the network resources of the first TSN domain to support inter-domain TSN streams between respective listeners or talkers local to the first TSN domain and corresponding listeners or talkers local to one or more other TSN domains, based on exchanging listener and talker information with respective centralized network controllers of the one or more other TSN domains, and sharing at least some of the listener or talker information received from the one or more other TSN domains with first centralized user controller, for use by the centralized user controller in determining whether there are any end stations local to first TSN domain interested in providing or receiving TSN streams from any end stations local to the one or more TSN domains.

13. A method of operation by a first centralized network controller in a first Time-Sensitive Networking (TSN) domain, the method comprising:
configuring network resources of the first TSN domain to support intra-domain TSN streams between respective end stations in the first TSN domain operating as respective listeners or talkers, responsive to a first centralized user controller in the first TSN domain providing listener and talker information to the first centralized network controller; and
configuring the network resources of the first TSN domain to support inter-domain TSN streams between respective listeners or talkers in second and third TSN domains that are communicatively coupled via the first TSN domain, based on receiving listener and talker information with respective centralized network controllers of the second and third TSN domains.

14. A method of operation by a first centralized network controller in a first Time-Sensitive Networking (TSN) domain, the method comprising:
a centralized network controller of the first TSN domain receiving information from a centralized user controller of the first TSN domain, indicating an end station in the first TSN domain outputs a TSN stream, the end station being referred to as a talker;
the centralized network controller sending a talker advertisement via an inter-network interface, for receipt by one or more other centralized network controllers in respective other TSN domains, the talker advertisement including a talker group comprising information about the talker or the TSN stream, and further including a status group for holding status information about stream status between the talker and individual end stations operating as listeners in any of the respective other TSN domains; and
the centralized network controller determining end-to-end status of the TSN stream towards the listeners in the respective other TSN domains, based on receiving returned status information corresponding to stream status entries in the status group that depend on connectivity and resource availability in any of the respective other TSN domains that contain one or more of the listeners or that participate in conveying the TSN stream external to the first TSN domain.

15. The method of any of the previous embodiments, further comprising: providing user data; and
forwarding the user data to a host or to one of the local end stations.

Group B Embodiments

16. A system comprising:
a centralized user controller that is configured to discover local end stations, retrieve Time-Sensitive Networking (TSN) capabilities and requirements of the local end stations, and configure TSN features in the local end stations, the local end station belonging to a first TSN domain with which the centralized user controller is associated; and
a centralized network controller that is configured to exchange information with the centralized user controller regarding intra-domain TSN streams to be established between respective ones of the local end stations, and correspondingly configure network resources of the first TSN domain to support the intra-domain TSN streams;
wherein the centralized network controller comprises an inter-domain network interface that communicatively couples the centralized network controller with one or more other centralized network controllers respectively belonging to one or more other TSN domains, and wherein:
the centralized network controller is configured to:
advertise to the one or more other TSN domains local end stations that are operative as talkers, receive corresponding listener advertisements from the one or more other TSN domains, regarding end stations that are local to the one or more other TSN domains and are interested as listeners, and cooperate with the centralized user controller to configure the talkers and network resources in the first TSN domain, to support TSN streams from the talkers in the first TSN domain and the listeners in the one or more other TSN domains; and
receiver talker advertisements from the one or more other TSN domains, advertising end stations that are local to the one or more other TSN domains and operative as talkers, cooperate with the centralized user controller to determine whether there are any local end stations interested in any of the TSN streams corresponding to the talkers in the one or more other TSN domains, and, if so, send return listener information to the one or more other TSN domains, and configure network resources in the first domain for interested local listeners to receive the corresponding TSN stream(s) from the one or more other TSN domains.

Group C Embodiments

17. A network node configured for operation as a centralized network controller in a first Time-Sensitive Networking (TSN) domain, the network node comprising:
    processing circuitry configured to perform any of the steps of any of the Group A embodiments; and
    power supply circuitry configured to supply power to the processing circuitry.

18. A network node configured for operation as a centralized network controller in a first Time-Sensitive Networking (TSN) domain, the network node comprising:
    communication interface circuitry configured to communicatively couple the centralized network controller to one or more other centralized network controllers, each other centralized network controller belonging to a respective other TSN domain; and
    processing circuitry operatively associated with the communication interface circuitry and configured to perform any of the steps of any of the Group A embodiments.

19. A network node configured for operation as a centralized network controller in a first Time-Sensitive Networking (TSN) domain, the network node comprising:
    a memory storing instructions; and
    a processor that controls the network node to perform any of the steps of any of the Group A embodiments, based on executing the instructions stored in the memory.

20. A network node configured for operation as a centralized network controller in a first Time-Sensitive Networking (TSN) domain, the network node comprising one or more processing units or modules configured to perform any of the step of any of the Group A embodiments.

Group D Embodiments

D1. The method of any of the previous embodiments, further comprising:
    obtaining user data; and
    forwarding the user data to a user equipment in a TSN domain, or to a host that is communicatively coupled to the user equipment.

Group E Embodiments

E1. A user equipment configured to operate in a TSN domain, comprising:
    processing circuitry configured to generate a TSN stream for transmission or receive a TSN stream for processing; and
    power supply circuitry configured to supply power to the processing circuitry.

E2. A network node configured to operate in a TSN domain, the network node comprising:
    processing circuitry configured to perform any of the steps of any of the Group A embodiments;
    power supply circuitry configured to supply power to the processing circuitry.

E3. A user equipment (UE) to operate in a TSN domain, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to generate or process as TSN stream;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

E4. A host configured to operate in a communication system to provide an over-the-top (OTT) service, the host comprising:
    processing circuitry configured to provide user data; and
    a network interface configured to initiate transmission of the user data to a cellular network for transmission to a user equipment (UE),
    wherein the UE comprises a communication interface and processing circuitry, the communication interface and processing circuitry of the UE being configured to receive the user data from the host.

E5. The host of the previous embodiment, wherein the cellular network provides communicative coupling for or within a TSN domain in which the UE operates, and further includes a network node configured to communicate with the UE to transmit the user data to the UE from the host.

E6. The host of the previous 2 embodiments, wherein:
    the processing circuitry of the host is configured to execute a host application, thereby providing the user data; and
    the host application is configured to interact with a client application executing on the UE, the client application being associated with the host application.

E7. A method implemented by a host operating in a communication system that further includes a network node and a user equipment (UE), the method comprising:
    providing user data for the UE; and
    initiating a transmission carrying the user data to the UE via a cellular network comprising the network node, wherein the UE receives the user data from the host.

E8. The method of the previous embodiment, further comprising:
    at the host, executing a host application associated with a client application executing on the UE to receive the user data from the UE.

E9. The method of the previous embodiment, further comprising:
    at the host, transmitting input data to the client application executing on the UE, the input data being provided by executing the host application,
    wherein the user data is provided by the client application in response to the input data from the host application.

E10. A host configured to operate in a communication system to provide an over-the-top (OTT) service, the host comprising:
    processing circuitry configured to generate outgoing user data for a User Equipment (UE), or process incoming user data originated from the UE; and
    a network interface configured to initiate transmission of outgoing user data to a cellular network for transmission to the UE, and to receive incoming user data from the UE, as provided through the cellular network;
    wherein the UE comprises a communication interface and processing circuitry, the communication interface and processing circuitry of the UE being configured to send user data towards the host and receive user data from the host.

E11. The host of the previous embodiment, wherein the cellular network further includes a network node configured to communicate with the UE to transmit the user data from the UE to the host.

E12. The host of the previous 2 embodiments, wherein:
the processing circuitry of the host is configured to execute a host application, thereby providing the user data; and
the host application is configured to interact with a client application executing on the UE, the client application being associated with the host application.

E13. A method implemented by a host configured to operate in a communication system that further includes a network node and a user equipment (UE), the method comprising:
at the host, receiving user data transmitted to the host via the network node by the UE, wherein the UE transmits the user data to the host.

E14. The method of the previous embodiment, further comprising:
at the host, executing a host application associated with a client application executing on the UE to receive the user data from the UE.

E15. The method of the previous embodiment, further comprising:
at the host, transmitting input data to the client application executing on the UE, the input data being provided by executing the host application,
wherein the user data is provided by the client application in response to the input data from the host application.

E16. A host configured to operate in a communication system to provide an over-the-top (OTT) service, the host comprising:
processing circuitry configured to provide user data; and
a network interface configured to initiate transmission of the user data to a network node in a cellular network for transmission to a user equipment (UE), the network node having a communication interface and processing circuitry operative to communicate with the UE.

E17. The host of the previous embodiment, wherein:
the processing circuitry of the host is configured to execute a host application that provides the user data; and
the UE comprises processing circuitry configured to execute a client application associated with the host application to receive the transmission of user data from the host.

E18. A method implemented in a host configured to operate in a communication system that further includes a network node and a user equipment (UE), the method comprising:
providing user data for the UE; and
initiating a transmission carrying the user data to the UE via a cellular network comprising the network node, wherein the network node transmits the user data from the host to the UE.

E19. The method of the previous embodiment, further comprising, at the network node, transmitting the user data provided by the host for the UE.

E20. The method of any of the previous 2 embodiments, wherein the user data is provided at the host by executing a host application that interacts with a client application executing on the UE, the client application being associated with the host application.

E21. A communication system configured to provide an over-the-top service, the communication system comprising:
a host comprising:
processing circuitry configured to provide user data for a user equipment (UE), the user data being associated with the over-the-top service; and
a network interface configured to initiate transmission of the user data toward a cellular network node for transmission to the UE, the network node having a communication interface and processing circuitry, the processing circuitry of the network node configured to transmit the user data from the host to the UE.

E22. The communication system of the previous embodiment, further comprising:
the network node; and/or
the user equipment.

E23. A host configured to operate in a communication system to provide an over-the-top (OTT) service, the host comprising:
processing circuitry configured to initiate receipt of user data; and
a network interface configured to receive the user data from a network node in a cellular network, the network node having a communication interface and processing circuitry, the processing circuitry of the network node configured to receive the user data from a user equipment (UE) for the host.

E24. The host of the previous 2 embodiments, wherein:
the processing circuitry of the host is configured to execute a host application, thereby providing the user data; and
the host application is configured to interact with a client application executing on the UE, the client application being associated with the host application.

E25. The host of the any of the previous 2 embodiments, wherein the initiating receipt of the user data comprises requesting the user data.

E26. A method implemented by a host configured to operate in a communication system that further includes a network node and a user equipment (UE), the method comprising:
at the host, initiating receipt of user data from the UE, the user data originating from a transmission which the network node has received from the UE, wherein the network node receives the user data from the UE for the host.

E27. The method of the previous embodiment, further comprising at the network node, transmitting the received user data to the host.

REFERENCES

IEEE 802.1Qcc-2018

ABBREVIATIONS

CNC Central Network Configuration/Configurator/Controller
CUC Central User Configuration/Configurator/Controller
NNI Network/Network Interface
TSN Time-Sensitive Networking
UNI User/Network Interface
VLAN Virtual Local Area Network
1× RTT CDMA2000 1× Radio Transmission Technology
3GPP 3rd Generation Partnership Project
5G 5th Generation
6G 6th Generation ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICHCommon Pilot Channel
CPICHEc/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
eMBMS evolved Multimedia Broadcast Multicast Services
E-SMLC Evolved-Serving Mobile Location Centre
ECGI Evolved CGI
eNB E-UTRAN NodeB
ePDCCH Enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
gNB Base station in NR
GNSS Global Navigation Satellite System
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MAC Message Authentication Code
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Power Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDN Software Defined Networking
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TSN Time-Sensitive Networking
TT Transmission Time Interval
UE User Equipment
UL Uplink
USIM Universal Subscriber Identity Module
UTDOA Uplink Time Difference of Arrival
WCDMA Wide CDMA
WLANWide Local Area Network

What is claimed is:

1. A method of operation by a first centralized network controller in a first Time-Sensitive Networking (TSN) domain, the method comprising:
receiving information from a centralized user controller of the first TSN domain, indicating that an end station in the first TSN domain outputs a TSN stream, the end station being referred to as a talker;

sending a talker advertisement via an inter-network interface, for receipt by one or more other centralized network controllers, each other centralized network controller being in a respective other TSN domain, the talker advertisement including a talker group comprising information about the talker or the TSN stream, and further including a status group for holding status information about stream status between the talker and individual end stations operating as listeners in any one or more of the one or more other TSN domains; and determining end-to-end status of the TSN stream towards the listeners in the one or more other TSN domains, based on receiving returned status information corresponding to stream status entries in the status group that depend on connectivity and resource availability in each other TSN domain that contains one or more of the listeners or that participates in conveying the TSN stream.

2. The method according to claim 1, further comprising the centralized network controller configuring network resources in the first TSN domain in dependence on the determined end-to-end status of the TSN stream.

3. The method according to claim 2, wherein configuring the network resources in the first TSN domain in dependence on the determined end-to-end status of the TSN stream comprises configuring the network resources in the first TSN domain in dependence on whether the end-to-end status with respect to each other TSN domain that includes one or more listeners for the TSN stream indicates successful establishment of the TSN stream.

4. The method according to claim 1, wherein the method includes the centralized network controller exchanging inter-domain configuration information for each end station in the first TSN domain that is identified by the centralized user controller as a talker, for use by corresponding centralized network controllers and centralized user controllers in each other TSN domain that includes one or more end stations acting as listeners with respect to one of the talkers in the first TSN domain, and for obtaining end-to-end status information for TSN stream establishment with respect to each such listener.

5. The method according to claim 4, wherein the obtained end-to-end status information for a respective talker in the first TSN domain and the corresponding TSN stream depends on the success or failure of TSN stream establishment with respect to each listener in each other TSN domain that include one or more listeners for the corresponding TSN stream.

6. The method according to claim 1, wherein the method further comprises the centralized network controller of the first TSN domain configuring network resources of the first TSN domain to support intra-domain TSN streams between respective end stations in the first TSN domain operating as respective listeners or talkers, responsive to the first centralized user controller in the first TSN domain providing intra-domain listener and talker information to the first centralized network controller.

7. The method according to claim 1, wherein the method includes the centralized network controller of the first TSN domain configuring network resources of the first TSN domain to support inter-domain TSN streams between one or more end stations in the first TSN domain acting as listeners with respect to one or more end stations acting as talkers in respective ones of the one or more other TSN domains, based on receiving talker advertisements sent by or forwarded for the respective ones of the one or more other TSN domains.

8. The method of claim 1, wherein the method includes the centralized network controller of the first TSN domain configuring network resources of the first TSN domain to support inter-domain TSN streams between respective listeners or talkers local to the first TSN domain and corresponding listeners or talkers local to respective ones of the one or more other TSN domains, based on exchanging listener and talker information with respective centralized network controllers of the one or more other TSN domains, and sharing at least some of the listener or talker information received from the one or more other TSN domains with the centralized user controller of the first TSN domain, for use by the centralized user controller in the first TSN domain in determining whether there are any end stations local to first TSN domain that are interested in providing or receiving TSN streams from any end stations local to the one or more other TSN domains.

9. The method of claim 1, wherein sending the talker advertisement is done as part of exchanging inter-domain configuration information with the one or more other TSN domains, which includes the centralized network controller of the first TSN domain sending information advertising talker end stations local to the first TSN domain, for use by centralized network controllers and corresponding centralized user controllers in each of the one or more other TSN domains, to determine whether there are any end stations local to the other TSN domain that are interested in listening to the corresponding TSN stream of any of the advertised talker end stations local to the first TSN domain.

10. The method of claim 9, wherein exchanging the inter-domain configuration information further comprises the centralized network controller of the first TSN domain receiving return information indicating whether there are any end stations local to any of the one or more external TSN domains interested in listening to the corresponding TSN stream of any of the advertised talker end stations local to the first TSN domain, and wherein, responsive to there being one or more end stations local to any of the one or more other TSN domains that are interested in listening, configuring network resources of the first TSN domain for sending the corresponding TSN stream(s) towards each other TSN domain that includes any one or more interested end stations.

11. The method of claim 9, wherein exchanging the inter-domain configuration information further includes the centralized network controller of the first TSN domain receiving information advertising talker end stations local to respective ones of the one or more other TSN domains, and wherein the method further comprises the centralized network controller of the first TSN domain indicating the advertised talker end stations to the centralized user controller of the first TSN domain, for determination by the centralized user controller of the first TSN domain as to whether any end stations local to the first TSN domain are interested in listening to the corresponding TSN stream of any the advertised talker end stations.

12. The method according to claim 1, wherein the method further comprises the centralized network controller of the first TSN domain filtering talker or listener information outgoing from the first TSN domain on one or more inter-network interfaces that communicatively couple the first TSN domain to the one or more other TSN domains, to remove one or more types of domain-specific information that are private to the first TSN domain, the outgoing talker or listener information exchanged in support of establishing inter-domain TSN streams.

13. A centralized network controller configured for operation in a first Time-Sensitive Networking (TSN) domain, the centralized network controller comprising:
communication interface circuitry; and
processing circuitry configured to:
receive, via the communication interface circuitry, information from a centralized user controller of the first TSN domain, indicating that an end station in the first TSN domain outputs a TSN stream, the end station being referred to as a talker; and
send, via the communication interface circuitry, a talker advertisement for receipt by one or more other centralized network controllers, each other centralized network controller being in a respective other TSN domain, the talker advertisement including a talker group comprising information about the talker or the TSN stream, and further including a status group for holding status information about stream status between the talker and individual end stations operating as listeners in any one or more of the one or more other TSN domains; and
determine end-to-end status of the TSN stream towards the listeners in the one or more other TSN domains, based on receiving, via the communication interface circuitry returned status information corresponding to stream status entries in the status group that depend on connectivity and resource availability each other TSN domain that contain one or more of the listeners or that participates in conveying the TSN stream.

14. The centralized network controller according to claim 13, wherein the processing circuitry is further configured to configure network resources in the first TSN domain in dependence on the determined end-to-end status of the TSN stream.

15. The centralized network controller according to claim 14, wherein, to configure the network resources in the first TSN domain in dependence on the determined end-to-end status of the TSN stream, the processing circuitry is configured to configure the network resources in the first TSN domain in dependence on whether the end-to-end status with respect to each other TSN domain that includes one or more listeners for the TSN stream indicates successful establishment of the TSN stream.

16. The centralized network controller according to claim 13, wherein the processing circuitry is configured to exchange with the one or more other TSN domains inter-domain configuration information for each end station in the first TSN domain that is identified by the centralized user controller as a talker, for use by corresponding centralized network controllers and centralized user controllers in each of the one or more other TSN domains that includes one or more end stations acting as listeners with respect to one of the talkers in the first TSN domain, and for obtaining end-to-end status information for TSN stream establishment with respect to each such listener.

17. The centralized network controller according to claim 16, wherein the obtained end-to-end status information for a respective talker in the first TSN domain and the corresponding TSN stream depends on the success or failure of TSN stream establishment with respect to each listener in each other TSN domain that include one or more listeners for the corresponding TSN stream.

18. The centralized network controller according to claim 13, wherein the processing circuitry is configured to configure network resources of the first TSN domain to support intra-domain TSN streams between respective end stations in the first TSN domain operating as respective listeners or talkers, responsive to the first centralized user controller in the first TSN domain providing intra-domain listener and talker information to the first centralized network controller.

19. The centralized network controller according to claim 13, wherein the processing circuitry is configured to configure network resources of the first TSN domain to support inter-domain TSN streams between one or more end stations in the first TSN domain acting as listeners with respect to one or more end stations acting as talkers in respective ones of the one or more other TSN domains, based on receiving talker advertisements sent by or forwarded for the respective ones of the one or more other TSN domains.

20. The centralized network controller of claim 13, wherein the processing circuitry is configured to configure network resources of the first TSN domain to support inter-domain TSN streams between respective listeners or talkers local to the first TSN domain and corresponding listeners or talkers local to respective ones of the one or more other TSN domains, based on exchanging listener and talker information with respective centralized network controllers of the one or more other TSN domains, and sharing at least some of the listener or talker information received from the one or more other TSN domains with the centralized user controller of the first TSN domain, for use by the centralized user controller in the first TSN domain in determining whether there are any end stations local to first TSN domain that are interested in providing or receiving TSN streams from any end stations local to the one or more other TSN domains.

21. The centralized network controller of claim 13, wherein sending the talker advertisement is done as part of exchanging inter-domain configuration information with the one or more other TSN domains, which the processing circuitry being configured to send information advertising talker end stations local to the first TSN domain, for use by centralized network controllers and corresponding centralized user controllers in each of the one or more other TSN domains, to determine whether there are any end stations local to the other TSN domain that are interested in listening to the corresponding TSN stream of any of the advertised talker end stations local to the first TSN domain.

22. The centralized network controller of claim 21, wherein, as part of exchanging the inter-domain configuration information, the processing circuitry is configured to receive return information indicating whether there are any end stations local to any of the one or more external TSN domains interested in listening to the corresponding TSN stream of any of the advertised talker end stations local to the first TSN domain, and wherein, responsive to there being one or more end stations local to any of the one or more other TSN domains that are interested in listening, configure network resources of the first TSN domain for sending the corresponding TSN stream(s) towards each other TSN domain that includes any one or more interested end stations.

23. The centralized network controller of claim 21, wherein, as part of exchanging the inter-domain configuration information, the processing circuitry is configured to receive information advertising talker end stations local to respective ones of the one or more other TSN domains, and indicate the advertised talker end stations to the centralized user controller of the first TSN domain, for determination by the centralized user controller of the first TSN domain as to whether any end stations local to the first TSN domain are interested in listening to the corresponding TSN stream of any the advertised talker end stations.

24. The centralized network controller according to claim 13, wherein the processing circuitry is configured to filter talker or listener information outgoing from the first TSN domain on one or more inter-network interfaces that communicatively couple the first TSN domain to the one or more other TSN domains, to remove one or more types of domain-specific information that are private to the first TSN domain, the outgoing talker or listener information exchanged in support of establishing inter-domain TSN streams.

* * * * *